US010812307B2

(12) United States Patent
Lin et al.

(10) Patent No.: US 10,812,307 B2
(45) Date of Patent: Oct. 20, 2020

(54) PHYSICAL LAYER PROTOCOL DATA UNIT TRANSMISSION METHOD AND APPARATUS

(71) Applicant: Huawei Technologies Co., Ltd., Shenzhen (CN)

(72) Inventors: Meilu Lin, Shenzhen (CN); Sheng Liu, Shenzhen (CN); Wei Lin, Shenzhen (CN); Jian Yu, Shenzhen (CN); Le Liu, Shenzhen (CN); Xun Yang, Shenzhen (CN); Shimon Shilo, Hod Hasharon (IL); Doron Ezri, Hod Hasharon (IL); Genadiy Tsodik, Hod Hasharon (IL); Oded Redlich, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/678,719

(22) Filed: Nov. 8, 2019

(65) Prior Publication Data

US 2020/0119963 A1 Apr. 16, 2020

Related U.S. Application Data

(63) Continuation of application No. 15/803,654, filed on Nov. 3, 2017, which is a continuation of application No. PCT/CN2015/079394, filed on May 20, 2015.

(30) Foreign Application Priority Data

May 5, 2015 (WO) ................ PCT/CN2015/078333

(51) Int. Cl.
*H04L 27/26* (2006.01)
*H04L 29/08* (2006.01)
(Continued)

(52) U.S. Cl.
CPC ........ *H04L 27/2626* (2013.01); *H04L 5/0048* (2013.01); *H04L 5/0091* (2013.01);
(Continued)

(58) Field of Classification Search
None
See application file for complete search history.

(56) References Cited

U.S. PATENT DOCUMENTS 9,615,291 B2 * 4/2017 Kenney ............... H04W 52/241
2004/0187125 A1 * 9/2004 Ko ........................ H04W 24/08
718/100

(Continued)

FOREIGN PATENT DOCUMENTS

CN 1464654 A 12/2003
CN 102946640 A 2/2013
(Continued)

OTHER PUBLICATIONS

U.S. Appl. No. 15/803,654, filed Nov. 3, 2017.
(Continued)

*Primary Examiner* — Ruihua Zhang
(74) *Attorney, Agent, or Firm* — Leydig, Voit & Mayer, Ltd.

(57) ABSTRACT

Embodiments of the present disclosure provide a physical layer protocol data unit (PPDU) transmission method and a corresponding PPDU transmission apparatus. Application of the method and apparatus in the embodiments of the present disclosure enables a receive end to quickly determine the starting position of the feature signal sequence by means of blind detection, and ensures that the receive end quickly completes data processing and status switching.

20 Claims, 12 Drawing Sheets

(51) Int. Cl.
*H04L 5/00* (2006.01)
*H04W 84/12* (2009.01)

(52) U.S. Cl.
CPC .......... *H04L 27/26* (2013.01); *H04L 27/2605* (2013.01); *H04L 69/323* (2013.01); *H04W 84/12* (2013.01)

(56) References Cited

U.S. PATENT DOCUMENTS

| | | |
|---|---|---|
| 2009/0252110 A1 | 10/2009 | Sridhara et al. |
| 2011/0096797 A1 | 4/2011 | Zhang et al. |
| 2012/0236971 A1 | 9/2012 | Taghavi Nasrabadi et al. |
| 2013/0128807 A1 | 5/2013 | Vermani et al. |
| 2014/0146720 A1 | 5/2014 | Tang et al. |
| 2014/0307612 A1 | 10/2014 | Vermani et al. |
| 2014/0314064 A1 | 10/2014 | Park et al. |
| 2015/0071372 A1 | 3/2015 | Zhang et al. |
| 2015/0117433 A1 | 4/2015 | Zhang et al. |
| 2015/0146808 A1 | 5/2015 | Chu et al. |
| 2015/0304077 A1 | 10/2015 | Cao et al. |
| 2015/0365263 A1 | 12/2015 | Zhang et al. |
| 2016/0050093 A1 | 2/2016 | Choi et al. |
| 2016/0087766 A1 | 3/2016 | Sun et al. |
| 2016/0087827 A1 | 3/2016 | Zhang et al. |
| 2016/0134406 A1 | 5/2016 | Chu et al. |
| 2016/0165524 A1 | 6/2016 | Kim et al. |
| 2016/0234697 A1 | 8/2016 | Azizi et al. |
| 2016/0261724 A1 | 9/2016 | Lee et al. |
| 2016/0286012 A1 | 9/2016 | Yu et al. |
| 2016/0337969 A1 | 11/2016 | Park et al. |
| 2016/0345202 A1 | 11/2016 | Bharadwaj et al. |
| 2017/0338910 A1 | 11/2017 | Chun et al. |
| 2017/0367078 A1 | 12/2017 | Chun et al. |
| 2018/0006860 A1 | 1/2018 | Zhang et al. |

FOREIGN PATENT DOCUMENTS

| | | |
|---|---|---|
| CN | 103621033 A | 3/2014 |
| CN | 103986682 A | 8/2014 |
| CN | 104363192 A | 2/2015 |
| EP | 3151497 A1 | 4/2017 |
| JP | 2017523660 A | 8/2017 |
| WO | 2012006513 A1 | 1/2012 |
| WO | 2013073921 A1 | 5/2013 |

OTHER PUBLICATIONS

Chen et al., "MAC and PHY Proposal for 802.11af," IEEE 802.11-10/0258r0, pp. 1-23, Institute of Electrical and Electronic Engineers, New York, New York (Mar. 2010).

"IEEE Standard for Information technology—Telecommunications and information exchange between systems—Local and metropolitan area networks—Specific Requirements; Part 11: Wireless LAN Medium Access Control (MAC) and Physical Layer (PHY) Specifications, Amendment 5:Enhancements for Higher Throughput," IEEE Std 802.11n-2009, pp. i-502, Institute of Electrical and Electronics Engineers, New York, New York (Oct. 29, 2009).

"IEEE Standard for Information technology—Telecommunications and information exchange between systems Local and metropolitan area networks—Specific requirements, Part 11: Wireless LAN Medium Access Control (MAC) and Physical Layer (PHY) Specifications; Amendment 4: Enhancements for Very High Throughput for Operation in Bands below 6 GHz," IEEE Std. 802.11ac-2013, pp. i-395, Institute of Electrical and Electronics Engineers, New York, New York (Approved Dec. 11, 2013).

Choi et al., "Envisioning 11ax PHY Structure—Part I," IEEE 11-14/0804r1, XP055229337, Institute of Electrical and Electronics Engineers, New York, New York (Jul. 14, 2014).

Zhang et al., "HE PHY Padding and Packet Extension," IEEE 802.11-15/0810, XP055208311, Institute of Electrical and Electronics Engineers, New York, New York (Jul. 10, 2015).

Zhang et al., "HE PHY Padding and Packet Extension," IEEE 802.11-15/0810, pp. 1-46, Institute of Electrical and Electronics Engineers, New York, New York (Sep. 12, 2015).

Kwon et al., "SIG Field Design Principle for 11ax," IEEE 802.11-15/0344r2, pp. 1-18, Institute of Electrical and Electronics Engineers, New York, New York (Mar. 9, 2015).

"Part 11: Wireless LAN Medium Access Control (MAC) and Physical Layer (PHY) Specifications," IEEE Std 802.11™-2012, pp. 1-2793, Institute of Electrical and Electronics Engineers —New York, New York (Mar. 29, 2012).

Stacey, "Specification Framework for TGax," IEEE P802.11 Wireless LANs, IEEE 802.11-15/0132r8, pp. 1-22, Institute of Electrical and Electronics Engineers , New York, New York (Sep. 2015).

Aboul-Magd, "TGax Sep. 2015 Meeting Agenda," IEEE 802.11-15/0987r6, pp. 1-110, Institute of Electrical and Electronics Engineers, New York, New York (Sep. 2015).

Noh et al.,"Considerations on PHY Padding and Packet Extension in 11ax," IEEE 802.11-15/1089r0, pp. 1-15, Institute of Electrical and Electronics Engineers, New York, New York (Sep. 2015).

\* cited by examiner

PHYSICAL LAYER PROTOCOL DATA UNIT TRANSMISSION METHOD AND APPARATUS

CROSS-REFERENCE TO RELATED APPLICATIONS

This application is a continuation of U.S. patent application Ser. No. 15/803,654, filed on Nov. 3, 2017, which is a continuation of International Application No. PCT/CN2015/079394, filed on May 20, 2015, which claims priority to International Patent Application No. PCT/CN2015/078333, filed on May 5, 2015. All of the aforementioned patent applications are hereby incorporated by reference in their entireties.

TECHNICAL FIELD

The present disclosure pertains to the field of communications technologies, and in particular, relates to a physical layer protocol data unit (PPDU) transmission method and apparatus.

BACKGROUND

In a wireless local area network (WLAN), to improve data transmission efficiency, a 4× symbol length is introduced into the next generation WLAN standard 802.11ax, and a symbol of 802.11a/n/ac is correspondingly referred to as a 1× symbol.

The 4× symbol length means that, in an orthogonal frequency division multiplexing (OFDM) symbol, a data length is 12.8 microseconds ($\mu$s). Correspondingly, a percentage of a 3.2 us cyclic prefix (CP) in an OFDM symbol is $(3.2/(3.2+12.8))=20\%$. This effectively improves transmission efficiency. It can be learnt that a time-domain transmission time of a data part changes from 3.2 us to 12.8 $\mu$s, which is a fourfold increase. In a frequency domain, there is a fourfold decrease in a bandwidth (BW) of each subcarrier correspondingly, because a smaller BW indicates a longer transmission time. Specifically, for 802.11ac, there are 64 subcarriers at 20 megahertz (MHz), corresponding to 64-point fast Fourier transform (FFT), 128 subcarriers at 40 MHz, corresponding to 128-point FFT, and 256 subcarriers at 80 MHz, corresponding to 256-point FFT. For 802.11ax, there are 256 subcarriers at 20 MHz, corresponding to 256-point FFT, 512 subcarriers at 40 MHz, corresponding to 512-point FFT, and 1024 subcarriers at 80 MHz, corresponding to 1024-point FFT.

Using 20 MHz as an example, the 64 subcarriers of 802.11ac include 52 data subcarriers and four pilot subcarriers, and the 256 subcarriers of 802.11ax include 234 data subcarriers and eight pilot subcarriers. If a same modulation and coding scheme (MCS) is used, a data volume that can be transmitted in 802.11ax is more than four times greater than a data volume that can be transmitted in 802.11ac, because 234>4*52. Results are the same for 40 MHz and 80 MHz.

After the 4× data symbol length is introduced, for a receive end, a time required for processing each OFDM symbol increases. A processing time at the receive end is mainly spent on: 1. FFT; 2. demapping; 3. channel decoding. Channel decoding is the most time-consuming of the three. Because a data volume in each OFDM symbol increases, a channel decoding time increases. This processing delay becomes very serious in the case of a high BW (such as 80 MHz) and/or a high MCS (such as MCS9).

After receiving some data frames or control frames that require immediate responses (respond after short interframe space (SIFS)=16 $\mu$s), the receive end needs to first complete processing of the data frames or the control frames and then switch from a receiving state to a sending state. The processing and switching need to be completed within an SIFS time. For a 1× symbol length (that is, a frame of 802.11a/n/ac), the SIFS time of 16 $\mu$s is sufficient for the receive end to complete data processing and status switching. However, for the 4× symbol length (that is, a frame of 802.11ax), data processing may result in a relatively long delay. As a result, within the current SIFS time of 16 $\mu$s, the receive end cannot complete data processing and status switching.

SUMMARY

The present disclosure provides a PPDU transmission method and apparatus, so as to resolve a problem that a receive end cannot complete data processing status switching within a current SIFS time of 16 $\mu$s due to a relatively long delay resulting from data processing at the receive end.

According to a first aspect, an embodiment of the present disclosure provides a PPDU transmission method, applied to a WLAN and including:

generating a PPDU, where some data subcarriers of a last OFDM symbol that carries useful information and that is in the PPDU carry a data symbol sequence, and the other data subcarriers of the last OFDM symbol that carries useful information carry a feature signal sequence; and sending the PPDU.

In a first possible implementation of the first aspect, the feature signal sequence includes a training symbol sequence known by a receive end.

In a second possible implementation of the first aspect, the feature signal sequence includes a zero signal sequence, and all signals in the zero signal sequence are zero.

In a third possible implementation of the first aspect, the feature signal sequence is a copy of the data symbol sequence carried by the some data subcarriers of the last OFDM symbol that carries useful information and that is in the PPDU.

In a fourth possible implementation of the first aspect, the feature signal sequence is a copy of a data symbol sequence carried by a data subcarrier in a corresponding position in a last but one OFDM symbol that carries useful information and that is in the PPDU.

In the first aspect and the foregoing possible implementations of the first aspect, the PPDU further includes a signal extension (SE) field, and the SE field is located after the last OFDM symbol that carries useful information.

According to a second aspect, an embodiment of the present disclosure provides a PPDU transmission method, applied to a WLAN and including:

receiving a PPDU, where some data subcarriers of a last OFDM symbol that carries useful information and that is in the PPDU carry a data symbol sequence, and the other data subcarriers of the last OFDM symbol carry a feature signal sequence; and parsing the PPDU to determine a starting position of the feature signal sequence.

In a first possible implementation of the second aspect, the feature signal sequence includes a training symbol sequence known by a receive end.

In a second possible implementation of the second aspect, the feature signal sequence includes a zero signal sequence, and all signals in the zero signal sequence are zero.

In a third possible implementation of the second aspect, the feature signal sequence is a copy of the data symbol sequence carried by the some data subcarriers of the last OFDM symbol that carries useful information and that is in the PPDU.

In a fourth possible implementation of the second aspect, the feature signal sequence is a copy of a data symbol sequence carried by a data subcarrier in a corresponding position in a last but one OFDM symbol that carries useful information and that is in the PPDU.

In the second aspect and the foregoing possible implementations of the second aspect, the PPDU further includes an SE field, and the SE field is located after the last OFDM symbol that carries useful information.

According to a third aspect, an embodiment of the present disclosure provides a PPDU transmission method, applied to a WLAN and including:

generating a PPDU, where the PPDU includes indication information, the indication information is located in a high efficiency signaling field (HE-SIG), the PPDU includes an SE field, and the SE field is located after a last OFDM symbol that carries useful information; and sending the PPDU.

In a first possible implementation of the third aspect, if N=M, a value of the indication information is a first value; or if N≠M, a value of the indication information is a second value; where N is a quantity of OFDM symbols included in the PPDU, and M is a quantity of OFDM symbols, in the PPDU, calculated by a receive end by using a length field in a legacy signaling field (L-SIG).

According to a fourth aspect, an embodiment of the present disclosure provides a PPDU transmission method, applied to a WLAN and including:

receiving a PPDU, where the PPDU includes indication information, the indication information is located in an HE-SIG, the PPDU includes an SE field, and the SE field is located after a last OFDM symbol that carries useful information; and parsing the PPDU to obtain a quantity M1 of OFDM symbols in transmission of the PPDU.

In a first possible implementation of the fourth aspect, the parsing the PPDU includes:

keeping a value of M1 unchanged if a value of the indication information is a first value; or subtracting 1 from M1 if a value of the indication information is a second value.

According to a fifth aspect, an embodiment of the present disclosure provides a PPDU transmission method, applied to a WLAN and including:

generating a PPDU, where the PPDU includes indication information, the indication information is located in an HE-SIG, the PPDU includes an SE field, the SE field is located after a last OFDM symbol that carries useful information, and the indication information is used to indicate duration of the PPDU that includes the SE field; and sending the PPDU.

According to a sixth aspect, an embodiment of the present disclosure provides a PPDU transmission method, applied to a WLAN and including:

receiving a PPDU, where the PPDU includes indication information, the indication information is located in an HE-SIG, the PPDU includes an SE field, the SE field is located after a last OFDM symbol that carries useful information, and the indication information is used to indicate duration of the PPDU that includes the SE field; and parsing the PPDU to obtain a quantity M2 of OFDM symbols in transmission of the PPDU.

In a first possible implementation of the sixth aspect, the parsing the PPDU to obtain a quantity M2 of OFDM symbols in transmission of the PPDU includes:

subtracting 1 from M2 if a difference between a transmission time of the PPDU and duration of the M2 OFDM symbols is less than duration of the SE field; or keeping a value of M2 unchanged if a difference between a transmission time of the PPDU and duration of the M2 OFDM symbols is greater than or equal to duration of the SE field.

According to a seventh aspect, an embodiment of the present disclosure provides a PPDU transmission apparatus, applied to a WLAN and including:

a processing unit, configured to generate a PPDU, where some data subcarriers of a last OFDM symbol that carries useful information and that is in the PPDU carry a data symbol sequence, and the other data subcarriers of the last OFDM symbol that carries useful information carry a feature signal sequence; and a transceiver unit, configured to send the PPDU.

In a first possible implementation of the seventh aspect, the feature signal sequence includes a training symbol sequence known by a receive end.

In a second possible implementation of the seventh aspect, the feature signal sequence includes a zero signal sequence, and all signals in the zero signal sequence are zero.

In a third possible implementation of the seventh aspect, the feature signal sequence is a copy of the data symbol sequence carried by the some data subcarriers of the last OFDM symbol that carries useful information and that is in the PPDU.

In a fourth possible implementation of the seventh aspect, the feature signal sequence is a copy of a data symbol sequence carried by a data subcarrier in a corresponding position in a last but one OFDM symbol that carries useful information and that is in the PPDU.

In the seventh aspect and the foregoing possible implementations of the seventh aspect, the PPDU further includes an SE field, and the SE field is located after the last OFDM symbol that carries useful information.

According to an eighth aspect, an embodiment of the present disclosure provides a PPDU transmission apparatus, applied to a WLAN and including:

a transceiver unit, configured to receive a PPDU, where some data subcarriers of a last OFDM symbol that carries useful information and that is in the PPDU carry a data symbol sequence, and the other data subcarriers of the last OFDM symbol carry a feature signal sequence; and a processing unit, configured to parse the PPDU to determine a starting position of the feature signal sequence.

In a first possible implementation of the eighth aspect, the feature signal sequence includes a training symbol sequence known by a receive end.

In a second possible implementation of the eighth aspect, the feature signal sequence includes a zero signal sequence, and all signals in the zero signal sequence are zero.

In a third possible implementation of the eighth aspect, the feature signal sequence is a copy of the data symbol sequence carried by the some data subcarriers of the last OFDM symbol that carries useful information and that is in the PPDU.

In a fourth possible implementation of the eighth aspect, the feature signal sequence is a copy of a data symbol sequence carried by a data subcarrier in a corresponding position in a last but one OFDM symbol that carries useful information and that is in the PPDU.

In the eighth aspect and the foregoing possible implementations of the eighth aspect, the PPDU further includes an SE field, and the SE field is located after the last OFDM symbol that carries useful information.

According to a ninth aspect, an embodiment of the present disclosure provides a PPDU transmission apparatus, applied to a WLAN and including:

a processing unit, configured to generate a PPDU, where the PPDU includes indication information, the indication information is located in an HE-SIG, the PPDU includes an SE field, and the SE field is located after a last OFDM symbol that carries useful information; and a transceiver unit, configured to send the PPDU.

In a first possible implementation of the ninth aspect, if N=M, a value of the indication information is a first value; or if N≠M, a value of the indication information is a second value; where N is a quantity of OFDM symbols included in the PPDU, and M is a quantity of OFDM symbols, in the PPDU, calculated by a receive end by using a length field in an L-SIG.

According to a tenth aspect, an embodiment of the present disclosure provides a PPDU transmission apparatus, applied to a WLAN and including:

a transceiver unit, configured to receive a PPDU, where the PPDU includes indication information, the indication information is located in an HE-SIG, the PPDU includes an SE field, and the SE field is located after a last OFDM symbol that carries useful information; and a processing unit, configured to parse the PPDU to obtain a quantity M1 of OFDM symbols in transmission of the PPDU.

In a first possible implementation of the tenth aspect, the parsing the PPDU includes:

keeping a value of M1 unchanged if a value of the indication information is a first value; or subtracting 1 from M1 if a value of the indication information is a second value.

According to an eleventh aspect, an embodiment of the present disclosure provides a PPDU transmission apparatus, applied to a WLAN and including:

a processing unit, configured to generate a PPDU, where the PPDU includes indication information, the indication information is located in an HE-SIG, the PPDU includes an SE field, the SE field is located after a last OFDM symbol that carries useful information, and the indication information is used to indicate duration of the PPDU that includes the SE field; and a transceiver unit, configured to send the PPDU.

According to a twelfth aspect, an embodiment of the present disclosure provides a PPDU transmission apparatus, applied to a WLAN and including:

a transceiver unit, configured to receive a PPDU, where the PPDU includes indication information, the indication information is located in an HE-SIG, the PPDU includes an SE field, the SE field is located after a last OFDM symbol that carries useful information, and the indication information is used to indicate duration of the PPDU that includes the SE field; and a processing unit, configured to parse the PPDU to obtain a quantity M2 of OFDM symbols in transmission of the PPDU.

In a first possible implementation of the twelfth aspect, the parsing the PPDU to obtain a quantity M2 of OFDM symbols in transmission of the PPDU includes:

subtracting 1 from M2 if a difference between a transmission time of the PPDU and duration of the M2 OFDM symbols is less than duration of the SE field; or keeping a value of M2 unchanged if a difference between a transmission time of the PPDU and duration of the M2 OFDM symbols is greater than or equal to duration of the SE field.

According to embodiments of the present disclosure, during transmission of a PPDU, some data subcarriers of a last OFDM symbol that carries useful information and that is in the PPDU carry a data symbol sequence, the other data subcarriers of the last OFDM symbol that carries useful information carry a feature signal sequence, and a starting position of the feature signal sequence is determined by parsing the PPDU. Application of the embodiments of the present disclosure enables a receive end to quickly determine the starting position of the feature signal sequence by means of blind detection, and ensures that the receive end quickly completes data processing and status switching.

DESCRIPTION OF EMBODIMENTS

Figure 1:
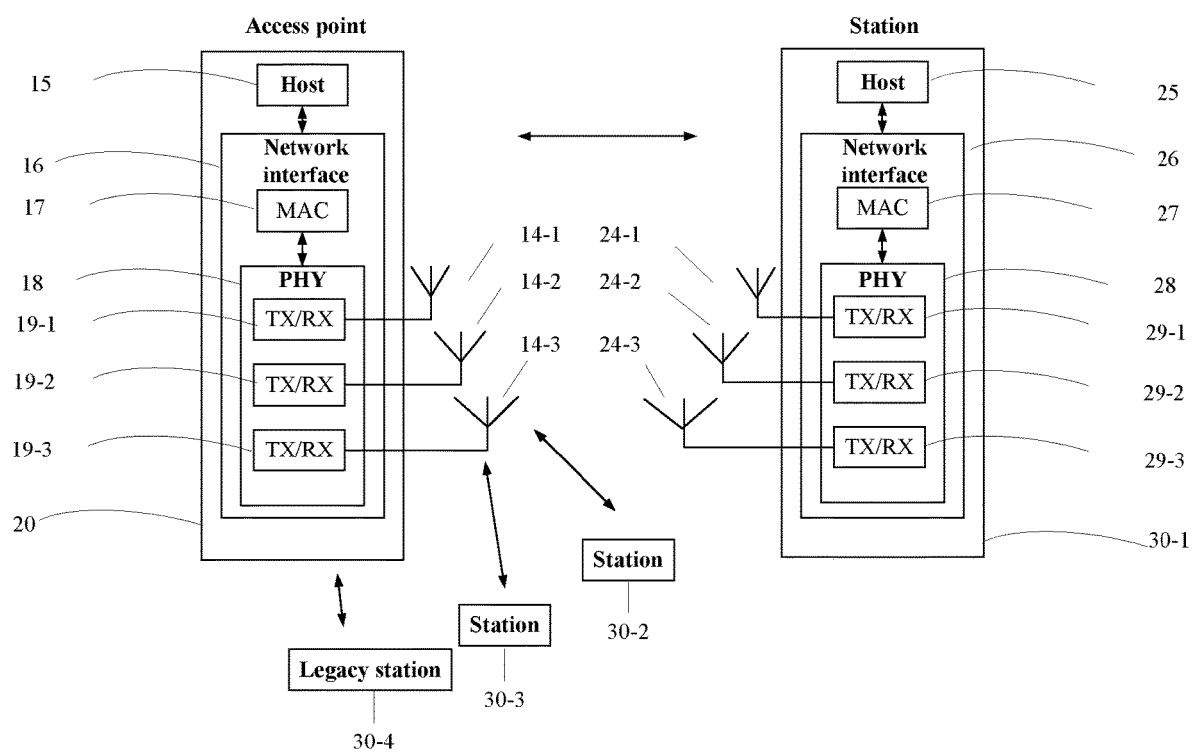
FIG. 1 is an application scenario diagram according to an embodiment of the present disclosure.

To make the objectives, technical solutions, and advantages of the present disclosure clearer, the following further describes the embodiments of the present disclosure in detail with reference to the accompanying drawings. To understand the present disclosure comprehensively, the following detailed description mentions many specific details. However, persons skilled in the art should understand that the present disclosure may be implemented without these specific details. In other embodiments, well-known methods, processes, components, and circuits are not described in detail, so as to prevent the embodiments from being blurred. Apparently, the embodiments described below are some rather than all of the embodiments of the present disclosure. All other embodiments obtained by persons of ordinary skill in the art based on the embodiments of the present disclosure without creative efforts shall fall within the protection scope of the present disclosure.

The embodiments of the present disclosure may be applied to a WLAN. A standard currently used for the WLAN is the Institute of Electrical and Electronics Engineers (IEEE) 802.11 series. The WLAN may include multiple basic service sets (BSSs). A node of a BSS is a station (STA). The STA may be an access point station (AP STA) or a non-access point station (non-AP STA). Each BSS may include an AP and multiple non-AP STAs associated with the AP.

The AP STA is also referred to as a wireless AP, a hotspot, or the like. The AP is an access point through which a mobile subscriber accesses a wired network, and is mainly deployed inside homes, buildings, and campuses. A typical coverage radius is tens of meters to a hundred meters. Certainly, the AP may also be deployed outdoors. The AP is like a bridge that connects a wired network and a wireless network. A main function of the AP is to connect various wireless network clients and then connect the wireless network to the wired network. Specifically, the AP may be a terminal device or network device with a wireless fidelity (WiFi) chip. Optionally, the AP may be a device that supports an 802.11ax standard. Further optionally, the AP may be a device that supports multiple WLAN standards, such as 802.11ac, 802.11n, 802.11g, 802.11b, and 802.11a.

The non-AP STA may be a wireless communications chip, a wireless sensor, or a wireless communications terminal, for example, a mobile telephone that supports a WiFi communication function, a tablet computer that supports the WiFi communication function, a set-top box that supports the WiFi communication function, a smart television that supports the WiFi communication function, a smart wearable device that supports the WiFi communication function, an onboard communication device that supports the WiFi communication function, or a computer that supports the WiFi communication function. Optionally, the STA may support the 802.11ax standard. Further optionally, the STA may support multiple WLAN standards, such as 802.11ac, 802.11n, 802.11g, 802.11b, and 802.11a.

It should be noted that, in the WLAN system 802.11ax into which an orthogonal frequency-division multiple access (OFDMA) technology is introduced, the AP can perform uplink and downlink transmission for different STAs by using different time-frequency resources. The AP can perform uplink and downlink transmission in different modes, for example, an OFDMA single user multiple-input multiple-output (SU-MIMO) mode or an OFDMA multi-user multiple-input multiple-output (MU-MIMO) mode.

FIG. 1 is an application scenario diagram according to an embodiment of the present disclosure. An AP 20 communicates with multiple STAs (30-1, 30-2, 30-3, and 30-4). The AP 20 includes a host processor 15 that is coupled to a network interface 16. The network interface 16 includes a media access control (MAC) unit 17 and a physical layer (PHY) unit 18. The PHY unit 18 includes multiple transceivers 19, and the transceivers 19 are coupled to multiple antenna pairs. Although FIG. 1 shows three transceivers 19 and three antenna pairs 14, in another implementation, an AP 20 may include different quantities (for example, 1, 2, 4, or 5) of transceivers 19 and antenna pairs.

The STA 30-1 includes a host processor 25 that is coupled to a network interface 26. The network interface 26 includes an MAC unit 27 and a PHY unit 28. The PHY unit 28 includes multiple transceivers 29, and the transceivers 29 are coupled to multiple antenna pairs. Although FIG. 1 shows three transceivers 29 and three antenna pairs 24, in another implementation, the client STA 30-1 may include different quantities (for example, 1, 2, 4, or 5) of transceivers and antenna pairs. In this implementation, one or more of the STA 30-2, the STA 30-3, or the STA 30-4 have a structure that is similar to or the same as that of the client STA 30-1, but may have same or different quantities of transceivers and antenna pairs. For example, the legacy STA 30-4 has only one transceiver and one antenna pair.

Figure 2:
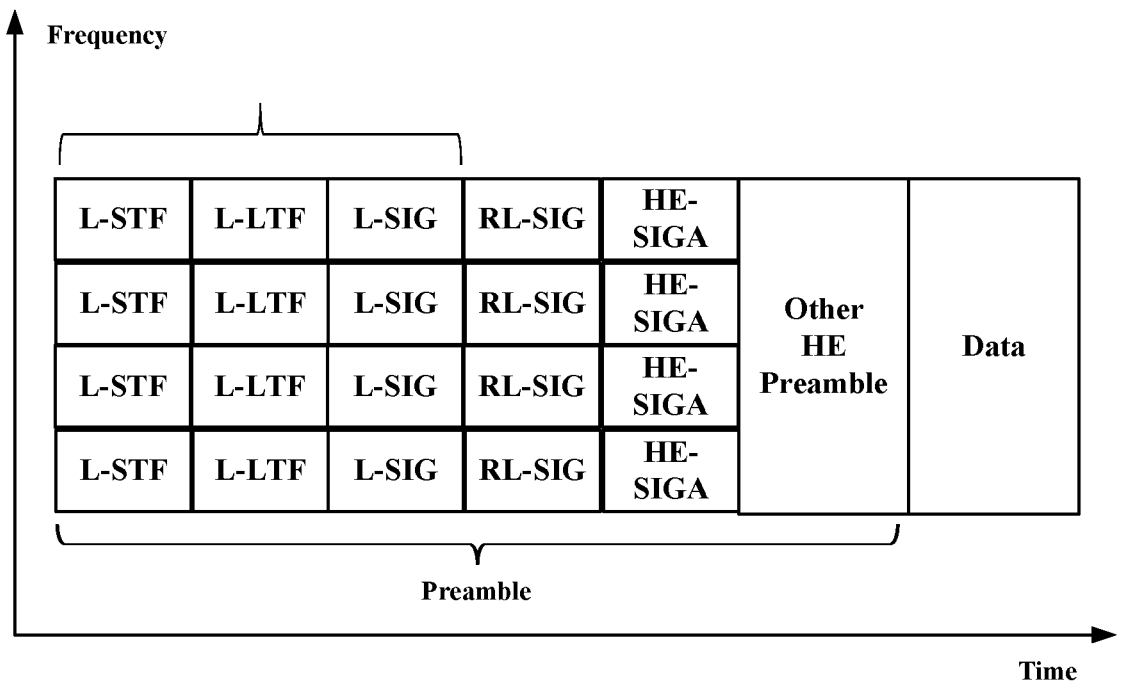
FIG. 2 is a structural diagram of a PPDU according to an embodiment of the present disclosure.

FIG. 2 is a structural diagram of a PPDU according to this implementation. This data unit occupies a BW of 80 MHz. In another implementation, a data unit 100 may occupy a different BW, for example, 20 MHz, 40 MHz, 120 MHz, 160 MHz, or any suitable BW. The data unit 100 is applicable to a "hybrid mode" circumstance, for example, a circumstance in which a WLAN 10 includes an STA (for example, the legacy STA 30-4) that complies with a legacy protocol rather than an 802.11ax protocol. The data unit 100 may also be used in another circumstance.

It should be noted that the data unit in FIG. 2 is a possible 802.11ax data unit. For the purpose of compatibility with an existing WLAN-standard device, a head of the 802.11ax data unit includes legacy preamble fields, including a legacy short training field (L-STF), a legacy long training field (L-LTF), and an L-SIG. Following the legacy preamble fields are a repeated legacy signaling field (RL-SIG), a high efficiency signaling field A (HE-SIGA), and an other high efficiency preamble field. It should be noted that the other HE preamble is a field or a combination of multiple fields and is not limited to a specific field. Following the other HE preamble field is a data field. In a possible future WLAN standard, a name of the standard, a name of a field, or the like may be replaced with any other name and should not be considered to impose limitation on the protection scope of the present disclosure. In addition, the description about the data frame also applies to the following embodiments.

Embodiment 1

Figure 4:
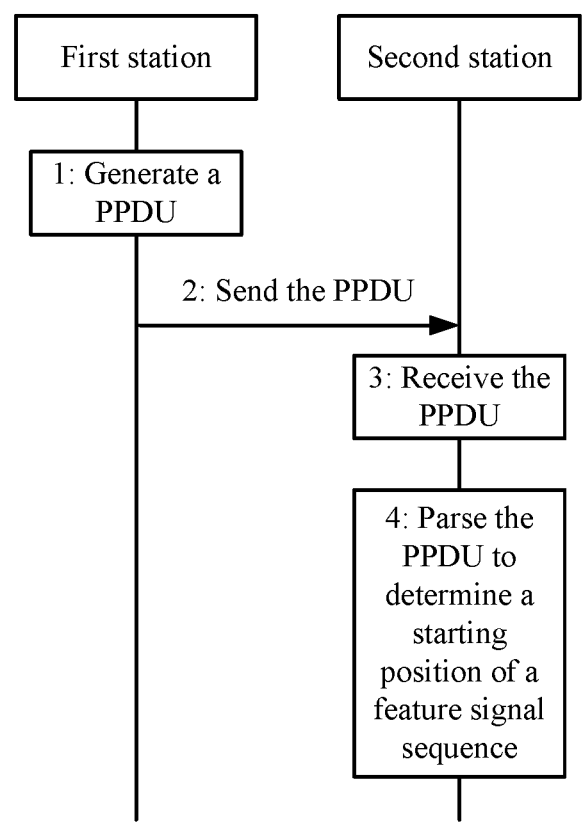
FIG. 4 is a flow interaction diagram according to Embodiment 1 of the present disclosure.

Embodiment 1 of the present disclosure provides a PPDU transmission method applied to a WLAN. The method can be applied to an STA, for example, an AP and an STA in FIG. 1. The STA can support a next generation WLAN standard, for example, an 802.11ax standard. FIG. 4 is an interaction diagram of the data transmission method. Specific steps are as follows.

Step 1: Generate a PPDU, where some data subcarriers of a last OFDM symbol that carries useful information and that is in the PPDU carry a data symbol sequence, and the other data subcarriers of the last OFDM symbol that carries useful information carry a feature signal sequence.

Optionally, the PPDU further includes an SE field, and the SE field is located after the last OFDM symbol that carries useful information.

Optionally, whether the current PPDU includes the SE can be determined according to a BW, an MCS, a number of spatial flows, a coding scheme, and the like that are indicated in a current HE-SIG. If the SE is not required in current transmission, a transmit end does not need to add the feature signal sequence to the last OFDM symbol, and a receive end does not need to perform detection on the feature signal sequence.

Figure 3:
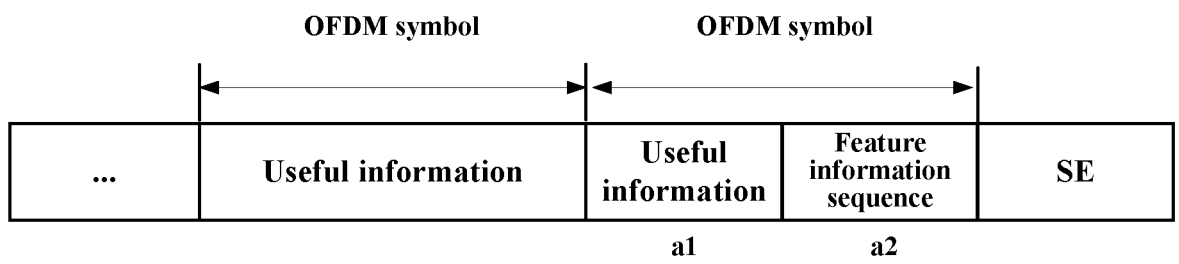
FIG. 3 is a partial structural diagram of a PPDU according to an embodiment of the present disclosure.

FIG. 3 is a partial structural diagram of data in the PPDU. The last OFDM symbol that carries useful information includes two parts. A data subcarrier in a first part carries a data symbol sequence, and this part is marked as a segment a1. A data subcarrier in a second part carries a feature signal sequence, and this part is marked as a segment a2.

It should be noted that a segment of SE is added after the last OFDM symbol that carries useful information, to provide the receive end with some additional time for processing received data. A length of the SE has multiple values and may be 0 µs, 4 µs, 8 µs, 12 µs, or 16 µS.

For example, when a ratio of the segment a1 to the last OFDM symbol that carries useful information is less than 0.5, or a low MCS or a very small number of spatial flows is used for PPDU transmission, a conventional SIFS time is sufficient for the receive end to complete data processing and status switching.

For example, when a ratio of the segment a1 to the last OFDM symbol that carries useful information is greater than 0.5, or a high MCS or a relatively large number of spatial flows is used for PPDU transmission, a conventional SIFS time is insufficient for the receive end to complete data processing and status switching, and the SE field needs to be added.

Step 2: Send the PPDU.

Step 3: Receive the PPDU.

Step 4: Parse the PPDU to determine a starting position of the feature signal sequence.

It should be noted that, in the last OFDM symbol that carries useful information, the second part is the feature signal sequence and does not participate in coding or decoding. Therefore, after determining the starting position of the feature signal sequence, the receive end does not perform decoding on the subcarrier in this part, thereby reducing a time required for data processing.

Specifically, the feature signal sequence includes at least four schemes.

Scheme 1: The feature signal sequence is a training symbol sequence known by the receive end.

It should be noted that the training symbol sequence is known for the receive end and the transmit end, and includes but is not limited to a pseudo random binary sequence (PRBS), an LTF sequence, or an STF sequence. A relatively short training symbol sequence may be used to fill in the segment a2 repeatedly, or a relatively long training symbol sequence may be generated to fill in the segment a2 directly. The receive end performs a correlation operation on the different segments of the last OFDM symbol that carries useful information, compares a correlation value obtained after the operation with a preset threshold, and if the correlation value is greater than the threshold, considers that correlation is detected, that is, determines start of the feature signal sequence.

Scheme 2: The feature signal sequence includes a zero signal sequence, and all signals in the zero signal sequence are zero.

It should be noted that the zero signal sequence is located in the segment a2, and the transmit end amplifies power of the segment a1. The receive end performs an energy computation on each segment of the last OFDM symbol that carries useful information, compares an energy value obtained after the computation with a preset threshold, and if the energy value is less than the threshold, considers that the segment is empty, that is, determines start of the feature signal sequence.

Scheme 3: The feature signal sequence is a copy of the data symbol sequence carried by the some data subcarriers in the last OFDM symbol that carries useful information and that is in the PPDU.

It should be noted that content of the segment a2 is some or all of data in the segment a1. The receive end performs a correlation operation on the segments in the symbol, compares a correlation value obtained after the operation with a preset threshold, and if the correlation value is greater than the threshold, considers that correlation is detected, that is, determines start of the feature signal sequence.

Scheme 4: The feature signal sequence is a copy of a data symbol sequence carried by a data subcarrier in a corresponding position in a last but one OFDM symbol that carries useful information and that is in the PPDU.

It should be noted that data, corresponding to the last but one OFDM symbol that carries useful information, of the segment a2 is repeated in the segment a2. The receive end performs a correlation operation on each segment of the symbol and a corresponding segment of a previous OFDM symbol, compares a correlation value obtained after the operation with a preset threshold, and if the correlation value is greater than the threshold, considers that correlation is detected, that is, determines start of the feature signal sequence.

Optionally, in another embodiment, for multi-user transmission (OFDMA or MU-MIMO), data of different users may not be aligned. That is, some users have larger data volumes and therefore have more OFDM symbols, whereas some users have smaller data volumes and therefore have fewer OFDM symbols.

1. In the case of multi-user transmission, a quantity of OFDM symbols needed in transmission for each user is calculated, and a greatest quantity is denoted by N.

2. For a user whose quantity of symbols is less than N, the quantity needs to be aligned with N by adding an OFDM symbol. Therefore, for the added OFDM symbol, a previous symbol may be repeated, or an OFDM symbol that carries a specific sequence whose correlation is good may be used. This is not limited.

For this reason, a special symbol adding manner may be used for the users who have smaller data volumes, so that the receive end determines an ending position of an OFDM symbol that carries useful data, and stops reception in advance, so as to save energy.

Optionally, in another embodiment, an ending position of each receiving node may be indicated in an explicit manner. Specific design of a receive end and a transmit end is as follows.

Transmit End:

In the case of multi-user transmission, a quantity of OFDM symbols needed in transmission for each user is calculated, and a greatest quantity is denoted by N. In a high efficiency signaling field B (HE-SIGB), there is an explicit indication for each user. The indication includes two parts. A first-part indication indicates whether a quantity of symbols of a current user is equal to N (for example, indicated by 1 bit). If the quantity is equal to N, a second-part indication indicates a position in which the user stops decoding in a last symbol (for example, a last OFDM symbol is divided into four segments, and the position in which decoding is stopped needs to be indicated by 2 bits). If the quantity is not equal to N, a second-part indication indicates a quantity of added OFDM symbols that the user has, so that the receive end stops decoding in the position in advance, and a total quantity of symbols is aligned with N.

Receive End:

The indication in the HE-SIGB is read. If the first-part indication is "true", the receive end determines that a quantity of its OFDM symbols is equal to N. Then, the second-part indication indicates a position in which the receive end stops decoding in a last OFDM symbol that carries useful information. For example, 00 indicates that decoding is stopped at ¼ of the last symbol, 01 indicates that decoding is stopped at ½ of the last symbol, and so on. If the receive end finds that the first-part indication is "false", the receive end determines that a quantity of its OFDM symbols is not equal to N. Then, the second-part indication indicates a quantity of added OFDM symbols of the receive end. For example, 00 indicates that x1 OFDM symbols are added, 01 indicates that x2 OFDM symbols are added, and so on.

It should be noted that the first-part indication may indicate whether the quantity of symbols of the current user is equal to N or indicate whether the quantity of symbols of the current user is greater than N−n. This is not limited. If the first-part indication indicates whether the quantity of symbols of the current user is greater than N−n, when the first-part indication is "false", in the second-part indication, 00 indicates that (x1+n) OFDM symbols are added, and 01 indicates that (x2+n) OFDM symbols are added.

According to this embodiment of the present disclosure, during transmission of a PPDU, some data subcarriers of a last OFDM symbol that carries useful information and that is in the PPDU carry a data symbol sequence, the other data subcarriers of the last OFDM symbol that carries useful information carry a feature signal sequence, and a starting position of the feature signal sequence is determined by parsing the PPDU. Application of this embodiment of the present disclosure enables a receive end to quickly determine the starting position of the feature signal sequence by means of blind detection, and ensures that the receive end quickly completes data processing and status switching.

Embodiment 2

Figure 5:
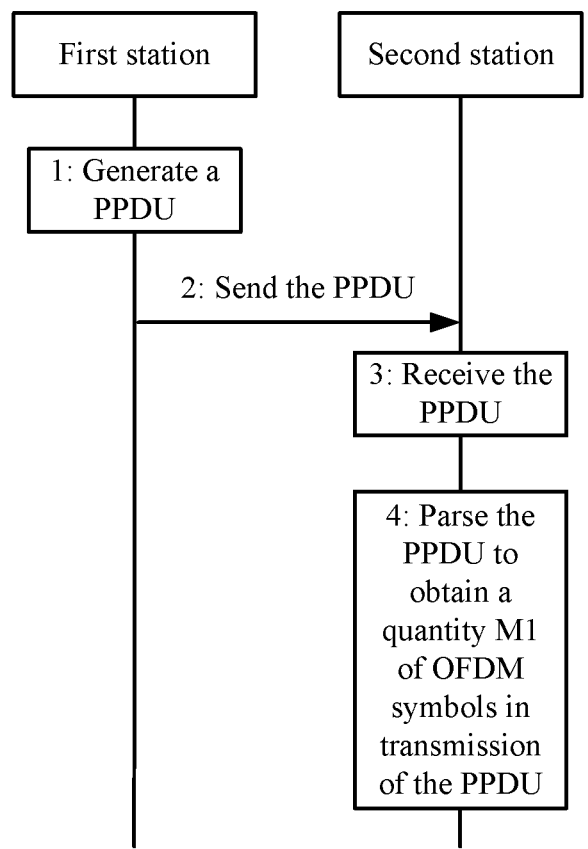
FIG. 5 is a flow interaction diagram according to Embodiment 2 of the present disclosure.

Embodiment 2 of the present disclosure provides a PPDU transmission method applied to a WLAN. The method can be applied to an STA, for example, an AP and an STA in FIG. 1. The STA can support a next generation WLAN standard, for example, an 802.11ax standard. FIG. 5 is an interaction diagram of the data transmission method. Specific steps are as follows.

Step 1: Generate a PPDU, where the PPDU includes indication information, the indication information is located in an HE-SIG, the PPDU includes an SE field, and the SE field is located after a last OFDM symbol that carries useful information.

Optionally, whether the current PPDU includes the SE can be determined according to a BW, an MCS, a number of spatial flows, a coding scheme, and the like that are indicated in the current HE-SIG. If the SE is not required in current transmission, a transmit end does not need to place an SE-related indication into the HE-SIG, and a receive end reads, according to another rule, a field corresponding to the HE-SIG.

Optionally, if N=M, a value of the indication information is a first value; if N≠M, a value of the indication information is a second value. N represents a quantity of OFDM symbols included in the PPDU, and M represents a quantity of OFDM symbols, in the PPDU, calculated by the receive end by using a length field in an L-SIG.

A formula for calculating N is specifically:

$$N = m_{STBC} \cdot \left\lceil \frac{8 \cdot A\_MPDU\_LENGTH + 16 + N_{Tail}}{m_{STBC} \cdot N_{DBPS}} \right\rceil,$$

where:

A_MPDU_LENGTH is a length of MAC layer data;

$N_{DBPS}$ is a quantity of data bit carried in each OFDM symbol;

$m_{STBC}$=2 when space time coding is used, or =1 in other cases; and $N_{Tail}$=6*a quantity of encoders when binary convolutional code (BCC) coding is used, or =0 when low-density parity-check (LDPC) coding is used.

If the transmit end uses LDPC coding, a value of N needs to be updated according to a coding parameter.

A formula for calculating M is specifically:

$$M = \left\lfloor \frac{RXTIME - T_{L\_PREAMBLE} - T_{HE\_PREAMBLE}}{(T_{GI} + 12.8)} \right\rfloor, \text{ where}$$

$$RXTIME = \left\lceil \frac{L\_LENGTH - m + 3}{3} \right\rceil \times 4 + 20;$$

L-LENGTH represents a length indication in L-preamble of the transmit end;

$T_{L\_PREAMBLE}$ represents a transmission time of the L-preamble; and $T_{HE\_PREAMBLE}$ represents a transmission time of HE-preamble.

Step 2: Send the PPDU.

Step 3: Receive the PPDU.

Step 4: Parse the PPDU to obtain a quantity M1 of OFDM symbols in transmission of the PPDU.

Optionally, a value of M1 is unchanged if a value of the indication information is a first value; 1 is subtracted from M1 if a value of the indication information is a second value.

According to this embodiment of the present disclosure, during transmission of a PPDU, the PPDU includes indication information, the indication information is located in an HE-SIG, the PPDU includes an SE field, and the SE field is located after a last OFDM symbol that carries useful information. Application of this embodiment of the present disclosure enables a receive end to determine a starting position of a feature signal sequence, and ensures that the receive end quickly completes data processing and status switching.

Embodiment 3

Embodiment 3 of the present disclosure provides a PPDU transmission method applied to a WLAN. The method can be applied to an STA, for example, an AP and an STA in FIG.

Figure 6:
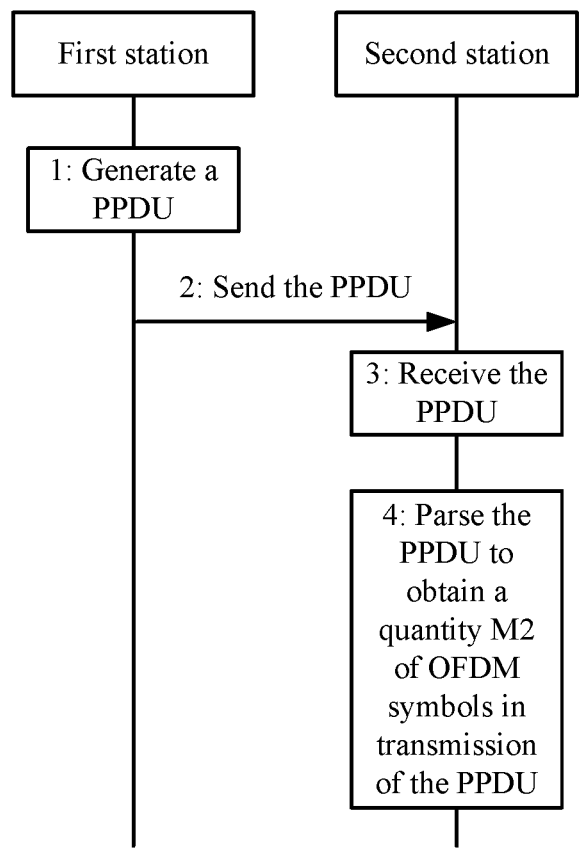
FIG. 6 is a flow interaction diagram according to Embodiment 3 of the present disclosure.

1. The STA can support a next generation WLAN standard, for example, an 802.11ax standard. FIG. 6 is an interaction diagram of the data transmission method. Specific steps are as follows.

Step 1: Generate a PPDU, where the PPDU includes indication information, the indication information is located in an HE-SIG, the PPDU includes an SE field, the SE field is located after a last OFDM symbol that carries useful information, and the indication information is used to indicate duration $T_{SE}$ of the SE field.

Optionally, whether the current PPDU includes the SE can be determined according to a BW, an MCS, a number of spatial flows, a coding scheme, and the like that are indicated in the current HE-SIG. If the SE is not required in current transmission, a transmit end does not need to place an SE-related indication into the HE-SIG, and a receive end reads, according to another rule, a field corresponding to the HE-SIG.

Step 2: Send the PPDU.
Step 3: Receive the PPDU.
Step 4: Parse the PPDU to obtain a quantity M2 of OFDM symbols in transmission of the PPDU.

Optionally, 1 is subtracted from M2 if a difference between a transmission time of the PPDU and duration of the M2 OFDM symbols is less than duration of the SE field.

Specifically, if RXTIME−(M2·($T_{GI}$+12.8)+$T_{L\_PREAMBLE}$+$T_{HE\_PREAMBLE}$)<$T_{SE}$, 1 is subtracted from M2.

A value of M2 is unchanged if a difference between a transmission time of the PPDU and duration of the M2 OFDM symbols is greater than or equal to duration of the SE field.

If RXTIME−(M2·($T_{GI}$+12.8)+$T_{L\_PREAMBLE}$+$T_{HE\_PREAMBLE}$)≥$T_{SE}$, M2 is unchanged.

According to this embodiment of the present disclosure, during transmission of a PPDU, the PPDU includes indication information, the indication information is located in an HE-SIG, the PPDU includes an SE field, the SE field is located after a last OFDM symbol that carries useful information, and the indication information is used to indicate duration of the PPDU that includes the SE field. Application of this embodiment of the present disclosure enables a receive end to determine a starting position of the feature signal sequence, and ensures that the receive end quickly completes data processing and status switching.

Embodiment 4

Figure 7:
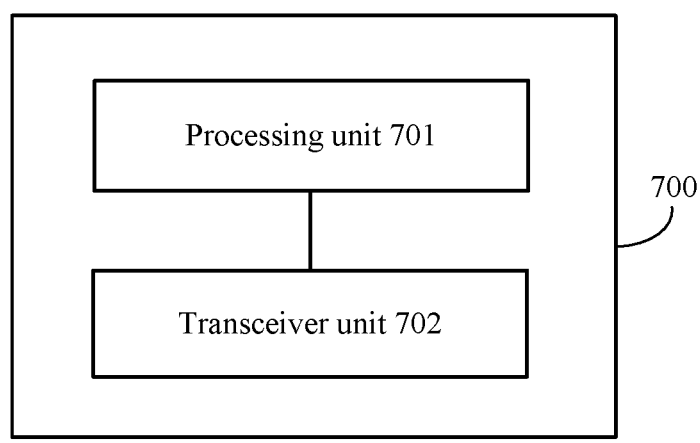
FIG. 7 is a logical structural diagram according to Embodiment 4 of the present disclosure.

Correspondingly, FIG. 7 is a schematic block diagram of a PPDU transmission apparatus in a WLAN according to Embodiment 4 of the present disclosure. The data transmission apparatus is, for example, an STA, or a dedicated circuit or chip that implements a related function. The PPDU transmission apparatus 700 shown in FIG. 7 includes a processing unit 701 and a transceiver unit 702. For example, the apparatus 700 may be an AP or an STA shown in FIG. 1. An STA in Embodiment 4 acts as a transmit end.

The processing unit 701 is configured to generate a PPDU, where some data subcarriers of a last OFDM symbol that carries useful information and that is in the PPDU carry a data symbol sequence, and the other data subcarriers of the last OFDM symbol that carries useful information carry a feature signal sequence.

The transceiver unit 702 is configured to send the PPDU.

Optionally, the feature signal sequence includes a training symbol sequence known by a receive end.

Optionally, the feature signal sequence includes a zero signal sequence, and all signals in the zero signal sequence are zero.

Optionally, the feature signal sequence is a copy of the data symbol sequence carried by the some data subcarriers in the last OFDM symbol that carries useful information and that is in the PPDU.

Optionally, the feature signal sequence is a copy of a data symbol sequence carried by a data subcarrier in a corresponding position in a last but one OFDM symbol that carries useful information and that is in the PPDU.

Optionally, the PPDU further includes an SE field, and the SE field is located after the last OFDM symbol that carries useful information.

According to this embodiment of the present disclosure, during transmission of a PPDU, some data subcarriers of a last OFDM symbol that carries useful information and that is in the PPDU carry a data symbol sequence, the other data subcarriers of the last OFDM symbol that carries useful information carry a feature signal sequence, and a starting position of the feature signal sequence is determined by parsing the PPDU. Application of this embodiment of the present disclosure enables a receive end to quickly determine the starting position of the feature signal sequence by means of blind detection, and ensures that the receive end quickly completes data processing and status switching.

Embodiment 5

Figure 8:
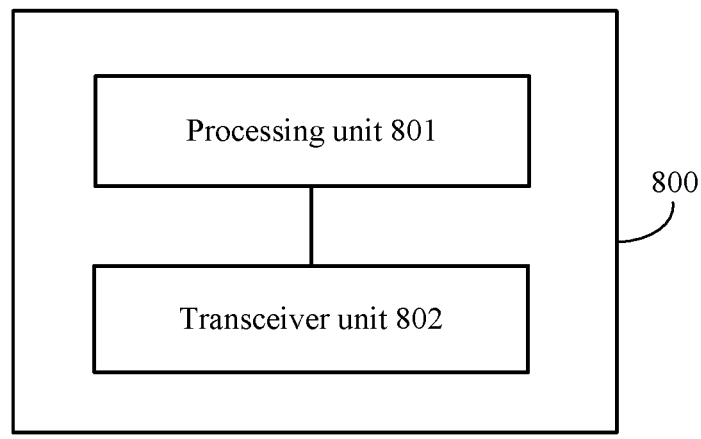
FIG. 8 is a logical structural diagram according to Embodiment 5 of the present disclosure.

Correspondingly, FIG. 8 is a schematic block diagram of a PPDU transmission apparatus in a WLAN according to Embodiment 5 of the present disclosure. The data transmission apparatus is, for example, an STA, or a dedicated circuit or chip that implements a related function. The PPDU transmission apparatus 800 shown in FIG. 8 includes a processing unit 801 and a transceiver unit 802. For example, the apparatus 800 may be an AP or an STA shown in FIG. 1. An STA in Embodiment 5 acts as a receive end.

The transceiver unit 802 is configured to receive a PPDU, where some data subcarriers of a last OFDM symbol that carries useful information and that is in the PPDU carry a data symbol sequence, and the other data subcarriers of the last OFDM symbol carry a feature signal sequence.

The processing unit 801 is configured to parse the PPDU to determine a starting position of the feature signal sequence.

Optionally, the feature signal sequence includes a training symbol sequence known by the receive end.

Optionally, the feature signal sequence includes a zero signal sequence, and all signals in the zero signal sequence are zero.

Optionally, the feature signal sequence is a copy of the data symbol sequence carried by the some data subcarriers in the last OFDM symbol that carries useful information and that is in the PPDU.

Optionally, the feature signal sequence is a copy of a data symbol sequence carried by a data subcarrier in a corresponding position in a last but one OFDM symbol that carries useful information and that is in the PPDU.

Optionally, the PPDU further includes an SE field, and the SE field is located after the last OFDM symbol that carries useful information.

According to this embodiment of the present disclosure, during transmission of a PPDU, some data subcarriers of a last OFDM symbol that carries useful information and that is in the PPDU carry a data symbol sequence, the other data subcarriers of the last OFDM symbol that carries useful information carry a feature signal sequence, and a starting position of the feature signal sequence is determined by parsing the PPDU. Application of this embodiment of the present disclosure enables a receive end to quickly determine the starting position of the feature signal sequence by means of blind detection, and ensures that the receive end quickly completes data processing and status switching.

Embodiment 6

Figure 9:
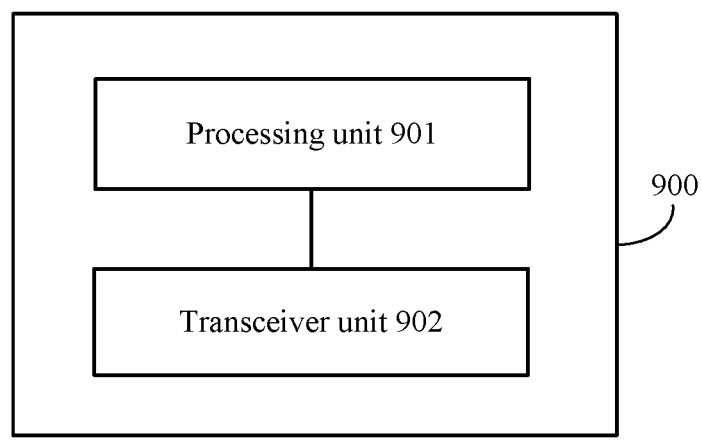
FIG. 9 is a logical structural diagram according to Embodiment 6 of the present disclosure.

Correspondingly, FIG. 9 is a schematic block diagram of a PPDU transmission apparatus in a WLAN according to Embodiment 6 of the present disclosure. The data transmission apparatus is, for example, an STA, or a dedicated circuit or chip that implements a related function. The PPDU transmission apparatus 900 shown in FIG. 9 includes a processing unit 901 and a transceiver unit 902. For example, the apparatus 900 may be an AP or an STA shown in FIG. 1. An STA in Embodiment 6 acts as a transmit end.

The processing unit 901 is configured to generate a PPDU, where the PPDU includes indication information, the indication information is located in an HE-SIG, the PPDU includes an SE field, and the SE field is located after a last OFDM symbol that carries useful information.

The transceiver unit 902 is configured to send the PPDU.

Optionally, if N=M, a value of the indication information is a first value; if N≠M, a value of the indication information is a second value. N represents a quantity of OFDM symbols included in the PPDU, and M represents a quantity of OFDM symbols, in the PPDU, calculated by a receive end by using a length field in an L-SIG.

According to this embodiment of the present disclosure, during transmission of a PPDU, the PPDU includes indication information, the indication information is located in an HE-SIG, the PPDU includes an SE field, the SE field is located after a last OFDM symbol that carries useful information, and the indication information is used to indicate duration of the PPDU that includes the SE field. Application of this embodiment of the present disclosure enables a receive end to determine a starting position of the feature signal sequence, and ensures that the receive end quickly completes data processing and status switching.

Embodiment 7

Figure 10:
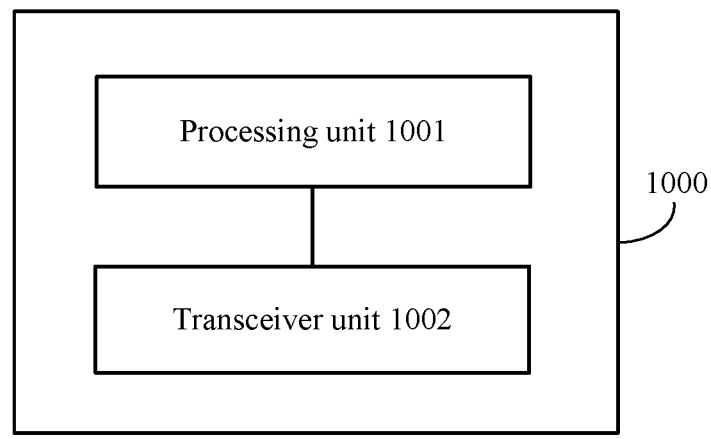
FIG. 10 is a logical structural diagram according to Embodiment 7 of the present disclosure.

Correspondingly, FIG. 10 is a schematic block diagram of a PPDU transmission apparatus in a WLAN according to Embodiment 7 of the present disclosure. The data transmission apparatus is, for example, an STA, or a dedicated circuit or chip that implements a related function. The PPDU transmission apparatus 1000 shown in FIG. 10 includes a processing unit 1001 and a transceiver unit 1002. For example, the apparatus 1000 may be an AP or an STA shown in FIG. 1. An STA in Embodiment 7 acts as a receive end.

The transceiver unit 1002 is configured to receive a PPDU, where the PPDU includes indication information, the indication information is located in an HE-SIG, the PPDU includes an SE field, and the SE field is located after a last OFDM symbol that carries useful information.

The processing unit 1001 is configured to parse the PPDU to obtain a quantity M1 of OFDM symbols in transmission of the PPDU.

Optionally, the parsing the PPDU includes: keeping a value of M1 unchanged if a value of the indication information is a first value; subtracting 1 from M1 if a value of the indication information is a second value.

According to this embodiment of the present disclosure, during transmission of a PPDU, the PPDU includes indication information, the indication information is located in an HE-SIG, the PPDU includes an SE field, the SE field is located after a last OFDM symbol that carries useful information, and the indication information is used to indicate duration of the PPDU that includes the SE field. Application of this embodiment of the present disclosure enables a receive end to determine a starting position of the feature signal sequence, and ensures that the receive end quickly completes data processing and status switching.

Embodiment 8

Figure 11:
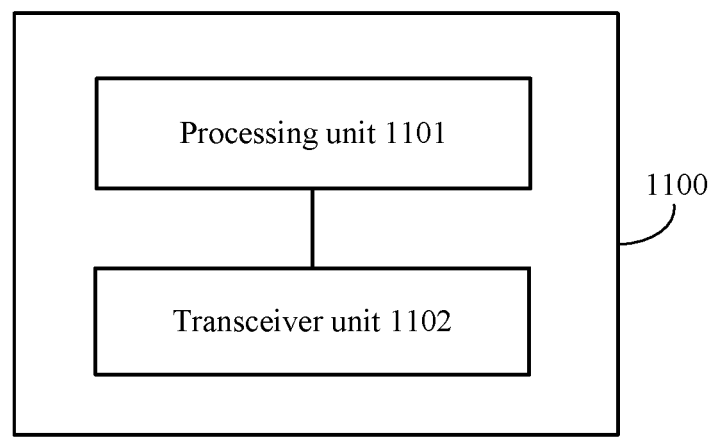
FIG. 11 is a logical structural diagram according to Embodiment 8 of the present disclosure.

Correspondingly, FIG. 11 is a schematic block diagram of a PPDU transmission apparatus in a WLAN according to Embodiment 8 of the present disclosure. The data transmission apparatus is, for example, an STA, or a dedicated circuit or chip that implements a related function. The PPDU transmission apparatus 1100 shown in FIG. 11 includes a processing unit 1101 and a transceiver unit 1102. For example, the apparatus 1100 may be an AP or an STA shown in FIG. 1. An STA in Embodiment 8 acts as a transmit end.

The processing unit 1101 is configured to generate a PPDU, where the PPDU includes indication information, the indication information is located in an HE-SIG, the PPDU includes an SE field, the SE field is located after a last OFDM symbol that carries useful information, and the indication information is used to indicate duration of the PPDU that includes the SE field.

The transceiver unit 1102 is configured to send the PPDU.

According to this embodiment of the present disclosure, during transmission of a PPDU, the PPDU includes indication information, the indication information is located in an HE-SIG, the PPDU includes an SE field, the SE field is located after a last OFDM symbol that carries useful information, and the indication information is used to indicate duration of the PPDU that includes the SE field. Application of this embodiment of the present disclosure enables a receive end to determine a starting position of the feature signal sequence, and ensures that the receive end quickly completes data processing and status switching.

Embodiment 9

Figure 12:
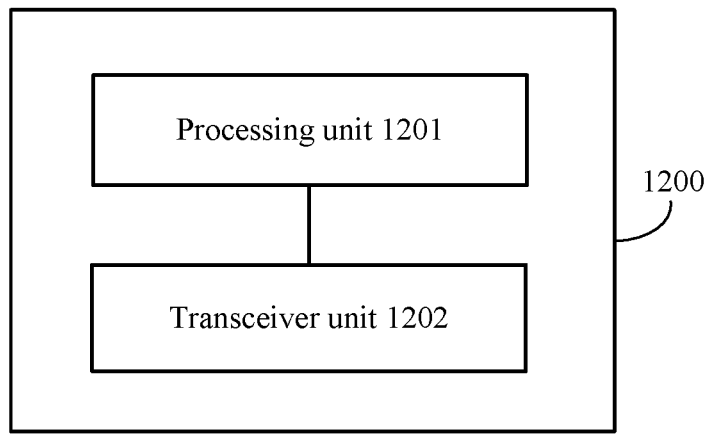
FIG. 12 is a logical structural diagram according to Embodiment 9 of the present disclosure.

Correspondingly, FIG. 12 is a schematic block diagram of a PPDU transmission apparatus in a WLAN according to Embodiment 9 of the present disclosure. The data transmission apparatus is, for example, an STA, or a dedicated circuit or chip that implements a related function. The PPDU transmission apparatus 1200 shown in FIG. 12 includes a processing unit 1201 and a transceiver unit 1202. For example, the apparatus 1200 may be an AP or an STA shown in FIG. 1. An STA in Embodiment 9 acts as a receive end.

The transceiver unit 1202 is configured to receive a PPDU, where the PPDU includes indication information, the indication information is located in an HE-SIG, the PPDU includes an SE field, the SE field is located after a last OFDM symbol that carries useful information, and the indication information is used to indicate duration of the PPDU that includes the SE field.

The processing unit 1201 is configured to parse the PPDU to obtain a quantity M2 of OFDM symbols in transmission of the PPDU.

Optionally, the parsing the PPDU to obtain a quantity M2 of OFDM symbols in transmission of the PPDU includes:

subtracting 1 from M2 if a difference between a transmission time of the PPDU and duration of the M2 OFDM symbols is less than duration of the SE field;

keeping a value of M2 unchanged if a difference between a transmission time of the PPDU and duration of the M2 OFDM symbols is greater than or equal to duration of the SE field.

According to this embodiment of the present disclosure, during transmission of a PPDU, the PPDU includes indication information, the indication information is located in an HE-SIG, the PPDU includes an SE field, the SE field is located after a last OFDM symbol that carries useful information, and the indication information is used to indicate duration of the PPDU that includes the SE field. Application of this embodiment of the present disclosure enables a receive end to determine a starting position of the feature signal sequence, and ensures that the receive end quickly completes data processing and status switching.

Embodiment 10

Figure 13:
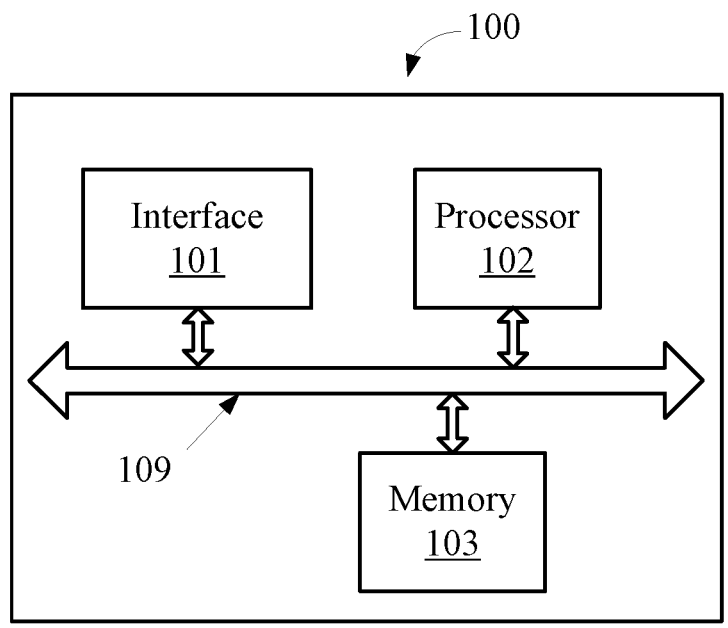
FIG. 13 is a physical structural diagram according to Embodiment 10 of the present disclosure.

FIG. 13 is a block diagram of a transmit STA according to Embodiment 10 of the present disclosure. The transmit STA in FIG. 13 includes an interface 101, a processing unit 102, and a memory 103. The processing unit 102 controls an operation of the transmit STA 100. The memory 103 may include a read-only memory (ROM) and a random access memory (RAM), and provides an instruction and data for the processing unit 102. A part of the memory 103 may also include a non-volatile random access memory (NVRAM). Components of the transmit STA 100 are coupled to each other by using a bus system 109. The bus system 109 not only includes a data bus but also includes a power bus, a control bus, and a status signal bus. However, for clear description, each bus in the diagram is marked as the bus system 109.

The methods that are for sending the foregoing various frames and that are disclosed in the foregoing embodiments of the present disclosure may be applied to the processing unit 102 or be implemented by the processing unit 102. In an implementation process, steps of the foregoing methods may be completed by using an integrated logic circuit of hardware in the processing unit 102 or by using an instruction in a software form. The processing unit 102 may be a general purpose processor, a digital signal processor, an application-specific integrated circuit, a field programmable gate array or another programmable logic device, a discrete gate or transistor logic device, or a discrete hardware component, and can implement or execute each method, step, and logical block diagram that are disclosed in the embodiments of the present disclosure. The general purpose processor may be a microprocessor or any conventional processor or the like. The steps of the methods disclosed with reference to the embodiments of the present disclosure may be directly performed by a hardware processor, or may be performed by using a combination of hardware in the processor and a software module. The software module may be located in a mature storage medium in the art, such as a RAM, a flash memory, a ROM, a programmable ROM, an electrically erasable programmable memory, a register, or the like. The storage medium is located in the memory 103, and the processing unit 102 reads information in the memory 103 and completes the steps of the foregoing methods in combination with hardware of the processing unit.

Embodiment 11

Figure 14:
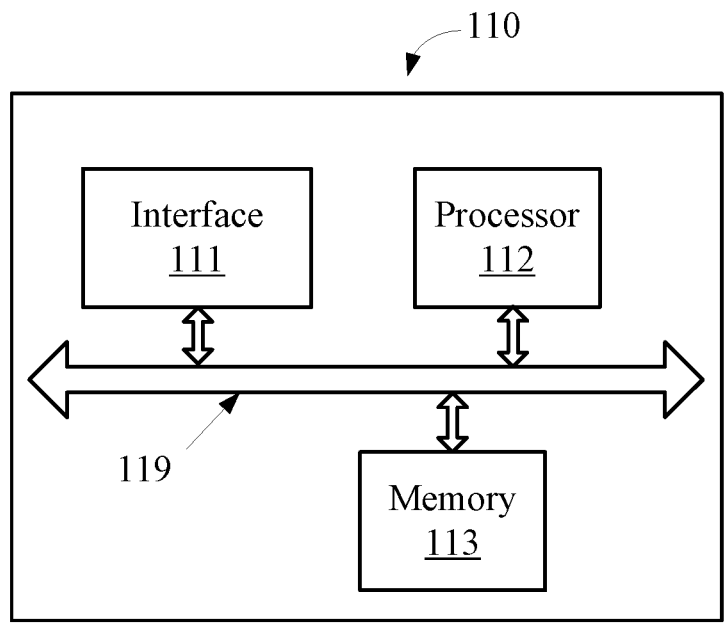
FIG. 14 is a physical structural diagram according to Embodiment 11 of the present disclosure.

FIG. 14 is a block diagram of a receive STA according to Embodiment 11 of the present disclosure. The receive STA in FIG. 14 includes an interface 111, a processing unit 112, and a memory 113. The processing unit 112 controls an operation of the receive STA 110. The memory 113 may include a ROM and a RAM, and provides an instruction and data for the processing unit 112. A part of the memory 113 may also include an NVRAM. Components of the receive STA 110 are coupled to each other by using a bus system 119. The bus system 119 not only includes a data bus but also includes a power bus, a control bus, and a status signal bus. However, for clear description, each bus in the diagram is marked as the bus system 119.

The methods that are for receiving the foregoing various frames and that are disclosed in the foregoing embodiments of the present disclosure may be applied to the processing unit 112 or be implemented by the processing unit 112. In an implementation process, steps of the foregoing methods may be completed by using an integrated logic circuit of hardware in the processing unit 112 or by using an instruction in a software form. The processing unit 112 may be a general purpose processor, a digital signal processor, an application-specific integrated circuit, a field programmable gate array or another programmable logic device, a discrete gate or transistor logic device, or a discrete hardware component, and can implement or execute each method, step, and logical block diagram that are disclosed in the embodiments of the present disclosure. The general purpose processor may be a microprocessor or any conventional processor or the like. The steps of the methods disclosed with reference to the embodiments of the present disclosure may be directly performed by a hardware processor, or may be performed by using a combination of hardware in the processor and a software module. The software module may be located in a mature storage medium in the art, such as a RAM, a flash memory, a ROM, a programmable ROM, an electrically erasable programmable memory, a register, or the like. The storage medium is located in the memory 113, and the processing unit 112 reads information in the memory 113 and completes the steps of the foregoing methods in combination with hardware of the processing unit.

Embodiment 12

Figure 15:
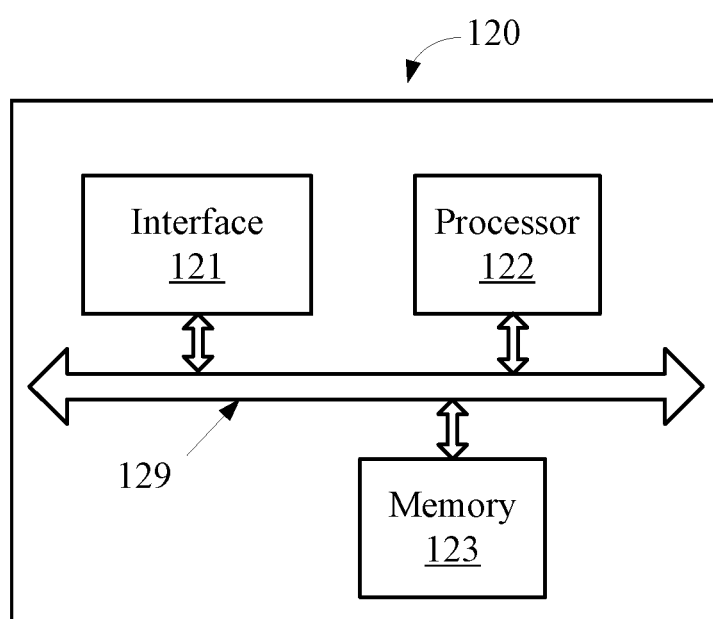
FIG. 15 is a physical structural diagram according to Embodiment 12 of the present disclosure.

FIG. 15 is a block diagram of a transmit STA according to Embodiment 12 of the present disclosure. The transmit STA in FIG. 15 includes an interface 121, a processing unit 122, and a memory 123. The processing unit 122 controls an operation of the transmit STA 120. The memory 123 may include a ROM and a RAM, and provides an instruction and data for the processing unit 122. A part of the memory 123 may also include an NVRAM. Components of the transmit STA 120 are coupled to each other by using a bus system 129. The bus system 129 not only includes a data bus but also includes a power bus, a control bus, and a status signal bus. However, for clear description, each bus in the diagram is marked as the bus system 129.

The methods that are for sending the foregoing various frames and that are disclosed in the foregoing embodiments of the present disclosure may be applied to the processing unit 122 or be implemented by the processing unit 122. In an implementation process, steps of the foregoing methods may be completed by using an integrated logic circuit of hardware in the processing unit 122 or by using an instruction in a software form. The processing unit 122 may be a general purpose processor, a digital signal processor, an application-specific integrated circuit, a field programmable gate array or another programmable logic device, a discrete gate or transistor logic device, or a discrete hardware component, and can implement or execute each method, step, and logical block diagram that are disclosed in the embodiments of the present disclosure. The general purpose processor may be a microprocessor or any conventional processor or the like. The steps of the methods disclosed with reference to the embodiments of the present disclosure may be directly performed by a hardware processor, or may be performed by using a combination of hardware in the processor and a software module. The software module may be located in a mature storage medium in the art, such as a RAM, a flash memory, a ROM, a programmable ROM, an electrically erasable programmable memory, a register, or the like. The storage medium is located in the memory 123, and the processing unit 122 reads information in the memory 123 and completes the steps of the foregoing methods in combination with hardware of the processing unit.

Embodiment 13

Figure 16:
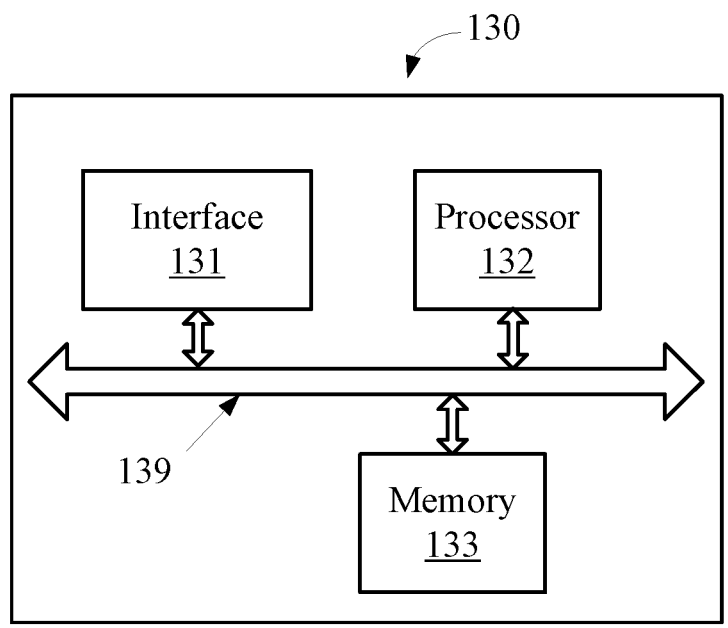
FIG. 16 is a physical structural diagram according to Embodiment 13 of the present disclosure.

FIG. 16 is a block diagram of a receive STA according to Embodiment 13 of the present disclosure. The receive STA in FIG. 16 includes an interface 131, a processing unit 132, and a memory 133. The processing unit 132 controls an operation of the receive STA 130. The memory 133 may include a ROM and a RAM, and provides an instruction and data for the processing unit 132. A part of the memory 133 may also include an NVRAM. Components of the receive STA 130 are coupled to each other by using a bus system 139. The bus system 139 not only includes a data bus but also includes a power bus, a control bus, and a status signal bus. However, for clear description, each bus in the diagram is marked as the bus system 139.

The methods that are for receiving the foregoing various frames and that are disclosed in the foregoing embodiments of the present disclosure may be applied to the processing unit 132 or be implemented by the processing unit 132. In an implementation process, steps of the foregoing methods may be completed by using an integrated logic circuit of hardware in the processing unit 132 or by using an instruction in a software form. The processing unit 132 may be a general purpose processor, a digital signal processor, an application-specific integrated circuit, a field programmable gate array or another programmable logic device, a discrete gate or transistor logic device, or a discrete hardware component, and can implement or execute each method, step, and logical block diagram that are disclosed in the embodiments of the present disclosure. The general purpose processor may be a microprocessor or any conventional processor or the like. The steps of the methods disclosed with reference to the embodiments of the present disclosure may be directly performed by a hardware processor, or may be performed by using a combination of hardware in the processor and a software module. The software module may be located in a mature storage medium in the art, such as a RAM, a flash memory, a ROM, a programmable ROM, an electrically erasable programmable memory, a register, or the like. The storage medium is located in the memory 133, and the processing unit 132 reads information in the memory 133 and completes the steps of the foregoing methods in combination with hardware of the processing unit.

Embodiment 14

Figure 17:
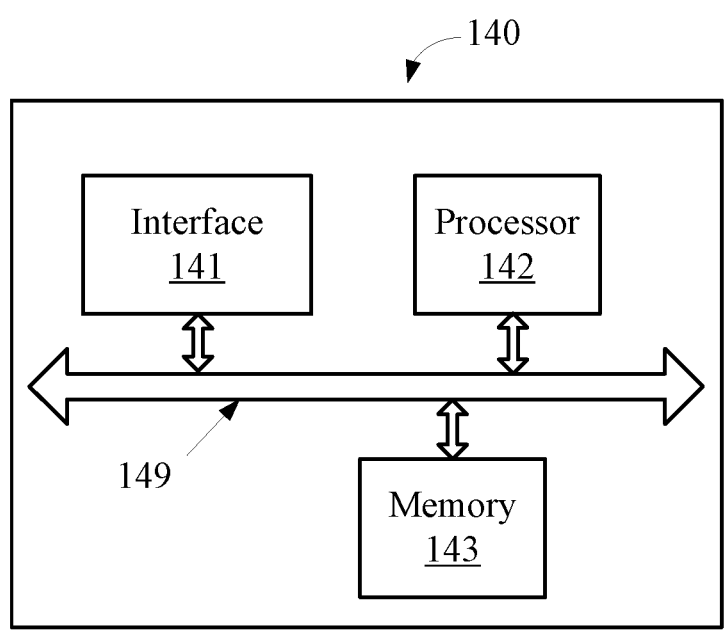
FIG. 17 is a physical structural diagram according to Embodiment 14 of the present disclosure.

FIG. 17 is a block diagram of a transmit STA according to Embodiment 14 of the present disclosure. The transmit STA in FIG. 17 includes an interface 141, a processing unit 142, and a memory 143. The processing unit 142 controls an operation of the transmit STA 140. The memory 143 may include a ROM and a RAM, and provides an instruction and data for the processing unit 142. A part of the memory 143 may also include an NVRAM. Components of the transmit STA 140 are coupled to each other by using a bus system 149. The bus system 149 not only includes a data bus but also includes a power bus, a control bus, and a status signal bus. However, for clear description, each bus in the diagram is marked as the bus system 149.

The methods that are for sending the foregoing various frames and that are disclosed in the foregoing embodiments of the present disclosure may be applied to the processing unit 142 or be implemented by the processing unit 142. In an implementation process, steps of the foregoing methods may be completed by using an integrated logic circuit of hardware in the processing unit 142 or by using an instruction in a software form. The processing unit 142 may be a general purpose processor, a digital signal processor, an application-specific integrated circuit, a field programmable gate array or another programmable logic device, a discrete gate or transistor logic device, or a discrete hardware component, and can implement or execute each method, step, and logical block diagram that are disclosed in the embodiments of the present disclosure. The general purpose processor may be a microprocessor or any conventional processor or the like. The steps of the methods disclosed with reference to the embodiments of the present disclosure may be directly performed by a hardware processor, or may be performed by using a combination of hardware in the processor and a software module. The software module may be located in a mature storage medium in the art, such as a RAM, a flash memory, a ROM, a programmable ROM, an electrically erasable programmable memory, a register, or the like. The storage medium is located in the memory 143, and the processing unit 142 reads information in the memory 143 and completes the steps of the foregoing methods in combination with hardware of the processing unit.

Embodiment 15

Figure 18:
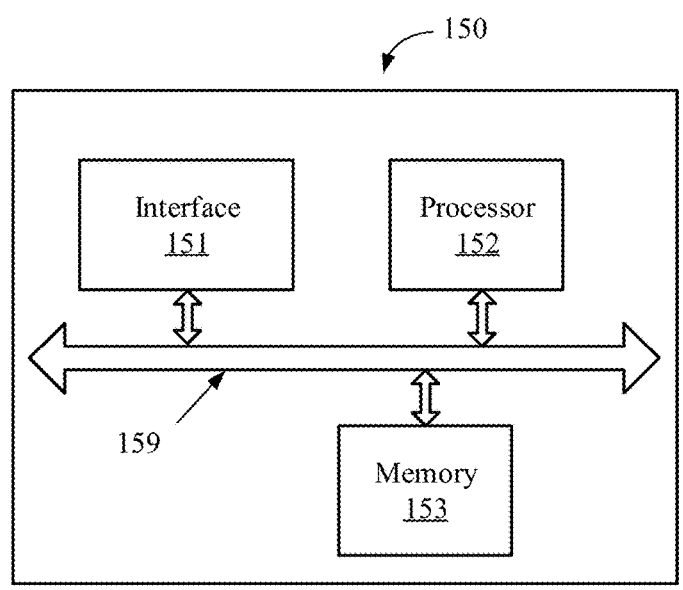
FIG. 18 is a physical structural diagram according to Embodiment 15 of the present disclosure.

FIG. 18 is a block diagram of a receive STA according to Embodiment 15 of the present disclosure. The receive STA in FIG. 18 includes an interface 151, a processing unit 152, and a memory 153. The processing unit 152 controls an operation of the receive STA 150. The memory 153 may include a ROM and a RAM, and provides an instruction and data for the processing unit 152. A part of the memory 153 may also include an NVRAM. Components of the receive STA 150 are coupled to each other by using a bus system 159. The bus system 159 not only includes a data bus but also includes a power bus, a control bus, and a status signal bus. However, for clear description, each bus in the diagram is marked as the bus system 159.

The methods that are for receiving the foregoing various frames and that are disclosed in the foregoing embodiments of the present disclosure may be applied to the processing unit 152 or be implemented by the processing unit 152. In an implementation process, steps of the foregoing methods may be completed by using an integrated logic circuit of hardware in the processing unit 152 or by using an instruction in a software form. The processing unit 152 may be a general purpose processor, a digital signal processor, an application-specific integrated circuit, a field programmable gate array or another programmable logic device, a discrete gate or transistor logic device, or a discrete hardware component, and can implement or execute each method, step, and logical block diagram that are disclosed in the embodiments of the present disclosure. The general purpose processor may be a microprocessor or any conventional processor or the like. The steps of the methods disclosed with reference to the embodiments of the present disclosure may be directly performed by a hardware processor, or may be performed by using a combination of hardware in the processor and a software module. The software module may be located in a mature storage medium in the art, such as a RAM, a flash memory, a ROM, a programmable ROM, an electrically erasable programmable memory, a register, or the like. The storage medium is located in the memory 153, and the processing unit 152 reads information in the memory 153 and completes the steps of the foregoing methods in combination with hardware of the processing unit.

The foregoing embodiments are merely intended to describe the technical solutions of the present disclosure, but are not intended to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

The following content is a supplement to the foregoing embodiments.

Embodiment 16

This embodiment provides an explanation or a further description about content of Embodiment 2, including steps performed by a transmit end and a receive end.

At the transmit end:

Step 1: Generate a PPDU, where the PPDU includes indication information, the indication information is located in an HE-SIG, the PPDU includes an SE field, and the SE field is located after a last OFDM symbol that carries useful information. The indication information is generated based on a symbol length of the SE field.

Optionally, whether the current PPDU includes the SE can be determined according to a BW, an MCS, a number of spatial flows, a coding scheme, or another parameter in the current HE-SIG.

Generally, the transmit end obtains the indication information according to a quantity N of OFDM symbols actually included in the PPDU and a quantity M of OFDM symbols, in the PPDU, calculated by using a length field in an L-SIG.

Optionally, if N=M, a value of the indication information is a first value; if N≠M, a value of the indication information is a second value.

For example, a formula for calculating N is specifically:

$$N = m_{STBC} \cdot \left\lceil \frac{8 \cdot A\_MPDU\_LENGTH + 16 + N_{Tail}}{m_{STBC} \cdot N_{DBPS}} \right\rceil,$$

where:

A_MPDU_LENGTH is a length of an MAC layer data packet;

$N_{DBPS}$ is a quantity of data bits carried in each OFDM symbol;

$m_{STBC}$=2 when space time coding is used, or =1 in other cases; and $N_{Tail}$=6*a quantity of encoders when BCC coding is used, or =0 when LDPC coding is used.

Optionally, if the transmit end uses LDPC coding, a value of N needs to be updated according to a coding parameter.

A formula for calculating M is specifically:

$$M = \left\lfloor \frac{RXTIME - T_{L\_PREAMBLE} - T_{HE\_PREAMBLE}}{(T_{GI} + 12.8)} \right\rfloor, \text{ where}$$

$$RXTIME = \left\lceil \frac{L\_LENGTH - m + 3}{3} \right\rceil \times 4 + 20;$$

L_LENGTH is a length indication in L_PREAMBLE of the transmit end;

$T_{L\_PREAMBLE}$ represents a transmission time of the L_PREAMBLE;

$T_{HE\_PREAMBLE}$ represents a transmission time of HE_PREAMBLE; and $T_{GI}$ represents a guard interval of the PPDU.

More specifically, $$L\_LENGTH = \left\lceil \frac{TXTIME - 20}{4} \right\rceil \times 3 - 3 + m, m = 1 \text{ or } 2.$$

Persons skilled in the art can understand that it can be known from the foregoing formulas that the symbol length of the SE affects a value of M, and thereby affects the value of the indication information.

Step 2: Send the PPDU.

More specifically, the indication information may be an explicit or implicit indication included in the HE-SIG, or an implicit bit indication in the L-SIG may be used. Certainly, this is not limited to the foregoing implementations.

The using an implicit bit indication in the L-SIG includes but is not limited to:

carrying the value by using a remainder m of L_LENGTH modulo 3, as shown in step 4 at the transmit end, for example: the remainder m=1 when N=M, or the remainder m=2 when N≠M; or conversely, the remainder m=2 when N=M, or the remainder m=1 when N≠M;

carrying the value by using polarity of the L-SIG and an RL-SIG or polarity of some bits of the L-SIG and the RL-SIG, for example, RL-SIG=L-SIG when N=M, or RL-SIG=L-SIG when N≠M.

At the receive end:

Step 10: Receive the PPDU.

Step 20: Parse the PPDU to obtain a quantity M1 of OFDM symbols in transmission of the PPDU.

Optionally, a value of M1 is unchanged if a value of the indication information is a first value; 1 is subtracted from M1 if a value of the indication information is a second value.

In an optional example, a process in which the receive end obtains the quantity M1 of the OFDM symbols in transmission of the PPDU may include the following steps:

Step 2001: Obtain a receive time RXTIME according to the L_LENGTH indication that is included in the PPDU and that is obtained by parsing the PPDU.

$$RXTIME = \left\lceil \frac{L\_LENGTH - m + 3}{3} \right\rceil \times 4 + 20, m = 1 \text{ or } 2.$$

Optionally,

Step 2002: Obtain a quantity M1 of OFDM symbols of the receive end according to RXTIME.

$$M1 = \left\lfloor \frac{RXTIME - T_{L\_PREAMBLE} - T_{HE\_PREAMBLE}}{T_{GI} + 12.8} \right\rfloor$$

Figure 19:
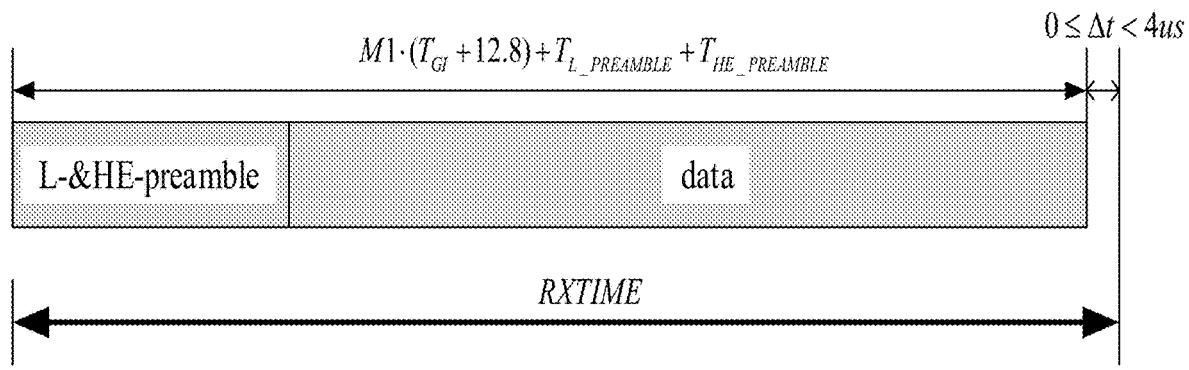
FIG. 19 is an SE structure indication diagram 1 according to the present disclosure.
Figure 20:
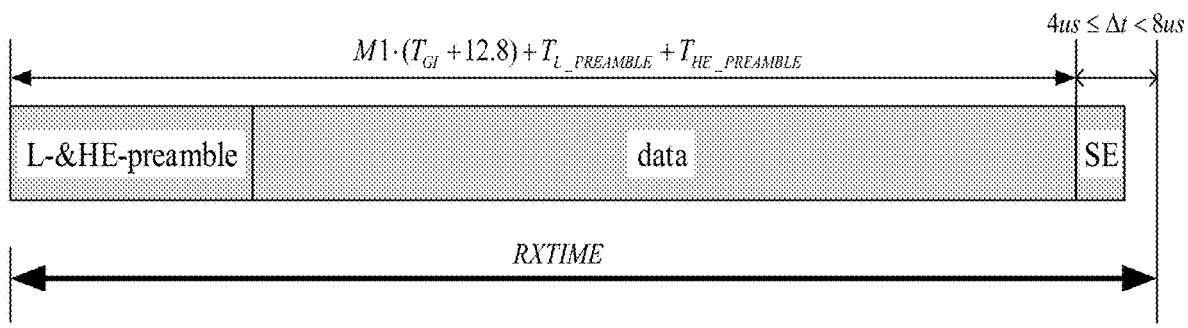
FIG. 20 is an SE structure indication diagram 2 according to the present disclosure.
Figure 21:
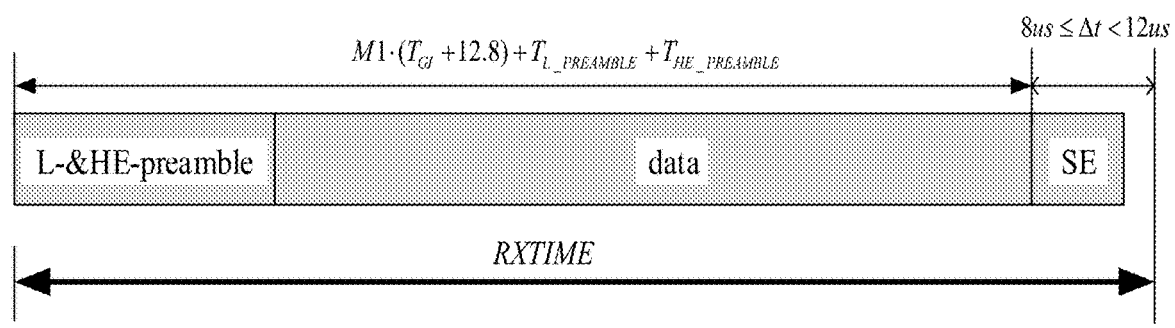
FIG. 21 is an SE structure indication diagram 3 according to the present disclosure.
Figure 22:
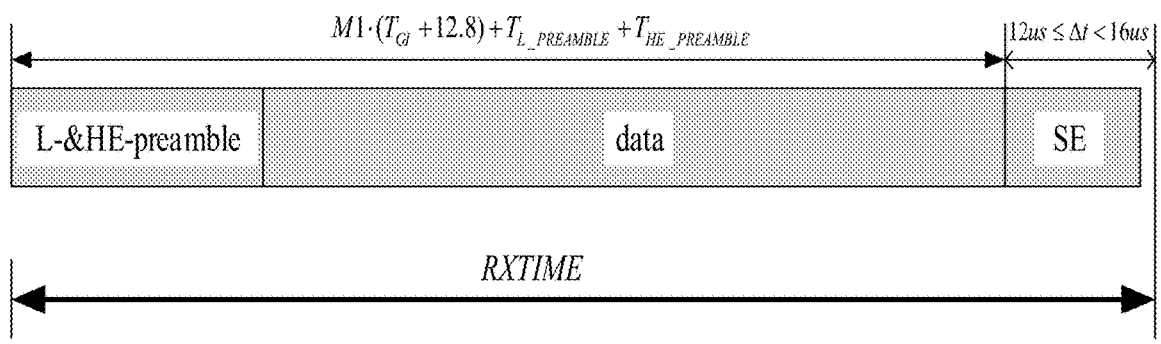
FIG. 22 is an SE structure indication diagram 4 according to the present disclosure.
Figure 23:
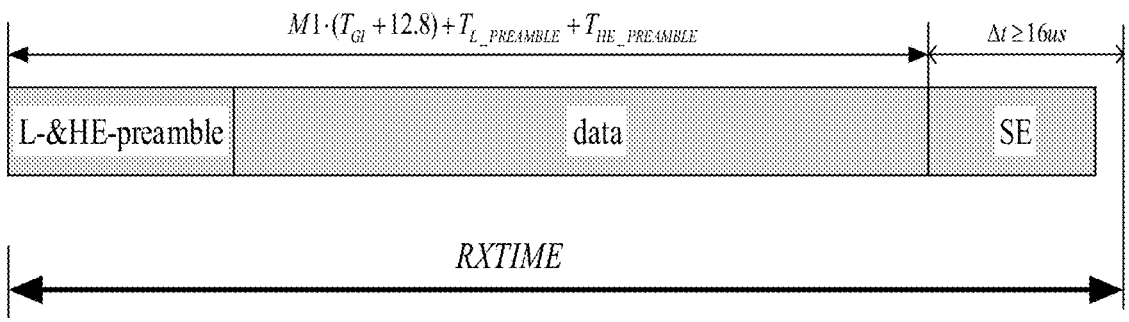
FIG. 23 is an SE structure indication diagram 5 according to the present disclosure.

Optionally, it should be noted that, if a one-to-one correspondence exists between a length of the SE and a position in which coding is stopped in a last symbol, for example, the length of the SE has four values 4 µs, 8 µs, 12 µs, and 16 µs, respectively corresponding to positions ¼, ½, ¾, and 1 in which coding is stopped in the last symbol, then a position in which the receive end stops coding in the last symbol can also be obtained by means of indication of whether the calculated quantity of symbols needs to be adjusted and calculation of L_LENGTH. A specific operation is as follows:

calculating $\Delta t = RXTIME - M1 \cdot (T_{GI} + 12.8) - T_{L\_PREAMBLE} - T_{HE\_PREAMBLE}$, where:

if 0≤Δt<4 us the length of the SE=0, that is, the SE does not exist, and the last symbol is calculated, as shown in FIG. 19;

if 4 us≤Δt<8 us, the length of the SE=4 µs, and a corresponding position in which coding is stopped in the last symbol is ¼, as shown in FIG. 20;

if 8 us≤Δt<12 us, the length of the SE=8 µs, and a corresponding position in which coding is stopped in the last symbol is ½, as shown in FIG. 21;

if 12 us≤Δt<16 us, the length of the SE=12 µs, and a corresponding position in which coding is stopped in the last symbol is ¾, as shown in FIG. 22;

if Δt>16 us, the length of the SE=16 µs, and a corresponding position in which coding is stopped in the last symbol is 4/4, as shown in FIG. 23.

According to this embodiment of the present disclosure, during transmission of a PPDU, the PPDU includes indication information, the indication information is located in an HE-SIG, the PPDU includes an SE field, and the SE field is located after a last OFDM symbol that carries useful information. Application of this embodiment of the present disclosure enables a receive end to determine a starting position of the feature signal sequence, and ensures that the receive end quickly completes data processing and status switching.

Embodiment 17

At a transmit end:

Step 1: Generate a PPDU, where the PPDU includes indication information, the indication information is located in an HE-SIG, the PPDU includes an SE field, the SE field is located after a last OFDM symbol that carries useful information, and the indication information is used to indicate duration $T_{SE}$ of the SE field.

Optionally, whether the current PPDU includes the SE can be determined according to a BW, an MCS, a number of spatial flows, a coding scheme, or the like indicated in the current HE-SIG.

Step 2: Send the PPDU.

At a receive end:

Step 10: Receive the PPDU.

Step 20: Parse the PPDU to obtain a quantity M2 of OFDM symbols in transmission of the PPDU.

Optionally, for a specific method for obtaining the quantity M2 of the OFDM symbols in transmission of the PPDU, refer to the implementation in step 2001 and step 2002 in the foregoing implementation 16, and details are not repeated herein.

Step 30: Calculate a value of S, where S is a receive time RXTIME, calculated by using L_LENGTH, and an actual transmission time of the data packet; and perform a corresponding operation on M2 according to a relationship between S and the indicated duration $T_{SE}$.

Specifically, $S = RXTIME - (M2 \cdot (T_{GI} + 12.8) - T_{L\_PREAMBLE} - T_{HE\_PREAMBLE})$.

For example, if $T_{SE} > t_1$ and $S < T_{SE}$, 1 is subtracted from M2;

if $T_{SE} < t_2$ and $S < T_{SE}$, a value of M2 is unchanged, and further, the receive end may determine an actual $T_{SE}$ time;

if $S \geq T_{SE}$, a value of M2 is unchanged.

A value range of $t_1$ is (8 µs, 12 µs), and a value range of $t_2$ is the same as that of $t_1$.

What is claimed is:

1. An apparatus for physical layer protocol data unit (PPDU) transmission, the apparatus being a first apparatus in a wireless local area network and comprising:
   a processor, and
   a memory coupled to the processor, wherein the memory stores instructions that, when executed by the processor, cause the first apparatus to:
   generate a PPDU, wherein:
   the PPDU comprises: a legacy signaling (L-SIG) field, indication information, and a signal extension (SE) field;
   the SE field is located behind a last orthogonal frequency division multiplexing (OFDM) symbol that carries data information in the PPDU;
   the L-SIG field comprises a Length field indicating a length;
   a value of the indication information is set based on a length of the SE field;
   a first value of the indication information indicates a second apparatus to keep a value of M1 unchanged, wherein M1 is a quantity of OFDM symbols calculated according to the length indicated by the Length field; and
   a second value of the indication information indicates the second apparatus to subtract 1 from the value of M1; and
   send the PPDU to the second apparatus.

2. The apparatus according to claim 1, wherein the indication information is further set based on the length indicated by the Length field.

3. The apparatus according to claim 1, wherein the length of the SE field is one of: 4 microseconds (µs), 8 µs, 12 µs, and 16 µs.

4. The apparatus according to claim 1, wherein the PPDU further comprises a high efficiency signaling (HE-SIG) field, and the HE-SIG field includes the indication information.

5. The apparatus according to claim 1, wherein the PPDU further comprises a data field, and the quantity M1 is a quantity of calculated OFDM symbols in the data field.

6. The apparatus according to claim 3, wherein the length of the SE field corresponds to a position in which coding is stopped in the last OFDM symbol.

7. The apparatus according to claim 6, wherein the length of the SE field has four values 4 µs, 8 µs, 12 µs, and 16 µs, respectively corresponding to positions ¼, ½, ¾, and 1 in which coding is stopped in the last OFDM symbol in the PPDU.

8. An apparatus for physical layer protocol data unit (PPDU) transmission, the apparatus being a second apparatus in a wireless local area network and comprising:

a processor, and a memory coupled to the processor, wherein the memory stores instructions that, when executed by the processor, cause the second apparatus to:

receive a PPDU from a first apparatus, wherein:

the PPDU comprises: a legacy signaling (L-SIG) field, indication information, and a signal extension (SE) field;

the SE field is located behind a last orthogonal frequency division multiplexing (OFDM) symbol that carries data information in the PPDU;

a value of the indication information is set based on a length of the SE field;

the L-SIG field comprises a Length field indicating a length;

a first value of the indication information indicates the second apparatus to keep a value of M1 unchanged, wherein M1 is a quantity of OFDM symbols calculated according to the length indicated by the Length field; and a second value of the indication information indicates the second apparatus to subtract 1 from the value of M1; and determine that a quantity of OFDM symbols for the second apparatus is equal to the value of M1 in response to a value of the indication information being the first value; and determine that a quantity of OFDM symbols for the second apparatus is equal to (M1-1) in response to a value of the indication information being the second value.

9. The apparatus according to claim 8, wherein the PPDU further comprises a high efficiency signaling (HE-SIG) field, and the HE-SIG field includes the indication information.

10. The apparatus according to claim 8, wherein the PPDU further comprises a data field, and the quantity M1 is a quantity of calculated OFDM symbols in the data field.

11. The apparatus according to claim 8, wherein the length of the SE field is one of: 4 microseconds (μs), 8 μs, 12 μs, and 16 μs.

12. The apparatus according to claim 11, wherein the length of the SE field corresponds to a position in which coding is stopped in the last OFDM symbol in the PPDU.

13. The apparatus according to claim 12, wherein the length of the SE field has four values 4 μs, 8 μs, 12 μs, and 16 μs, respectively corresponding to positions ¼, ½, ¾, and 1 in which coding is stopped in the last OFDM symbol in the PPDU.

14. A method for transmitting a physical layer protocol data unit (PPDU), wherein the method is applied in a wireless local area network, the method comprising:

generating, by a first apparatus, a PPDU, wherein:

the PPDU comprises: a legacy signaling (L-SIG) field, indication information, and a signal extension (SE) field;

the SE field is located behind a last orthogonal frequency division multiplexing (OFDM) symbol that carries data information in the PPDU;

a value of the indication information is set based on a length of the SE field;

the L-SIG field comprises a Length field indicating a length;

a first value of the indication information indicates a second apparatus to keep a value of M1 unchanged, wherein M1 is a quantity of OFDM symbols calculated according to the length indicated by the Length field; and a second value of the indication information indicates the second apparatus to subtract 1 from the value of M1; and sending, by the first apparatus, the PPDU to the second apparatus.

15. The method according to claim 14, wherein the PPDU further comprises a high efficiency signaling (HE-SIG) field, and the HE-SIG field includes the indication information.

16. The method according to claim 14, wherein the PPDU further comprises a data field, and the quantity M1 is a quantity of calculated OFDM symbols in the data field.

17. The method according to claim 14, wherein the length of the SE field is one of: 4 microseconds (μs), 8 μs, 12 μs, and 16 μs.

18. The method according to claim 17, wherein the length of the SE field corresponds to a position in which coding is stopped in the last OFDM symbol in the PPDU.

19. The method according to claim 18, wherein the length of the SE field has four values 4 μs, 8 μs, 12 μs, and 16 μs, respectively corresponding to positions ¼, ½, ¾, and 1 in which coding is stopped in the last OFDM symbol in the PPDU.

20. The method according to claim 14, wherein the indication information is further set based on the length indicated by the Length field.

\* \* \* \* \*